(12) United States Patent  
Ito

(10) Patent No.: US 6,674,553 B1
(45) Date of Patent: Jan. 6, 2004

(54) IMAGE READING APPARATUS AND IMAGE PROCESSING SYSTEM

(75) Inventor: Yohei Ito, Chichibu (JP)

(73) Assignee: Canon Denshi Kabushiki Kaisha, Chichibu (JP)

(*) Notice: Subject to any disclaimer, the term of this patent is extended or adjusted under 35 U.S.C. 154(b) by 0 days.

(21) Appl. No.: 09/542,374

(22) Filed: Apr. 4, 2000

(30) Foreign Application Priority Data

Apr. 9, 1999 (JP) ............................................. 11-102659
Apr. 9, 1999 (JP) ............................................. 11-102660
Apr. 9, 1999 (JP) ............................................. 11-103171

(51) Int. Cl.$^7$ ............................ G06F 1/00; H04N 1/04; H04N 1/46; G03G 15/00; G03B 23/02; G03B 23/04; G03B 23/06
(52) U.S. Cl. .................. 358/497; 358/1.14; 358/506; 399/8; 399/9; 353/68; 353/25
(58) Field of Search ............................... 358/1.14, 497, 358/506; 399/8, 9; 353/68, 25

(56) References Cited

U.S. PATENT DOCUMENTS 5,024,523 A * 6/1991 Jerie ............................ 353/11
5,764,886 A * 6/1998 Danielson et al. ............ 714/47

* cited by examiner

Primary Examiner—Edward Coles
Assistant Examiner—Houshang Safaipour
(74) Attorney, Agent, or Firm—Robin, Blecker & Daley

(57) ABSTRACT

A change-over part of an image reading apparatus changes over the function of an operation part disposed on the main body of the image reading apparatus between functioning as an operation part for a connection apparatus and functioning as an operation part for the main body of the image reading apparatus. By this arrangement, it is possible for the user to perform the various kinds of processing operations at the setting place of the image reading apparatus without coming and going between the image reading apparatus and a personal computer.

38 Claims, 22 Drawing Sheets

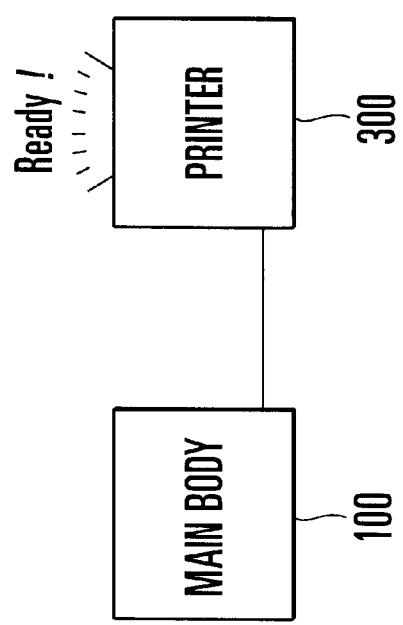
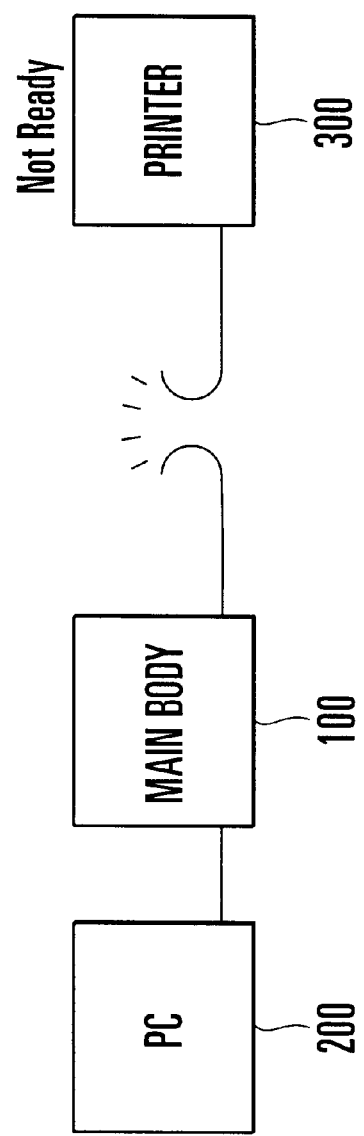
FIG. 5A
FIG. 5B

IMAGE READING APPARATUS AND IMAGE PROCESSING SYSTEM

BACKGROUND OF THE INVENTION

1. Field of the Invention

The present invention relates to an image reading apparatus and an image processing system arranged to output image information read out from, for example, a paper medium or a microfilm to a connection apparatus such as a printer or a personal computer.

2. Description of Related Art

It is being widely put into practice to connect a scanner serving as an image reading apparatus to a printer or a personal computer so as to cause image information of an original or the like obtained by the scanner to be displayed on the screen of the personal computer or to be printed out by the printer.

However, such a conventional image reading apparatus as described above is generally arranged to operate in accordance with an instruction from the personal computer. In other words, the operation of the conventional image reading apparatus is so passive that the various setting operations for reading and outputting of image information (the various kinds of setting for designating a scanning area or for printing-out, etc.) have to be performed only on the side of the personal computer.

Therefore, for example, the user is required to perform such a working operation as to set an original at the image reading apparatus, then, obtain desired image information by operating the personal computer, print out the image information, and again set the next original at the image reading apparatus for reading and outputting of the next original. In the above-mentioned way, in the past, it has been necessary for the user to perform an operation for reading and outputting of image information of an original or the like while coming and going between the setting place of the image reading apparatus and the setting place of the personal computer. It never can be said that this is efficient in view of labor and working efficiency of the user.

Meanwhile, an apparatus, called a microfilm scanner, arranged to project an image formed on a film onto a screen, scan the projected image to form image data, and store the image data into an image memory is being put into practical use.

In the microfilm scanner, an image formed on a microfilm is positioned in a predetermined position and is then illuminated by an illumination means composed of a light source lamp, a spherical mirror, a condenser lens, etc., which are disposed on the side of the main body of the microfilm scanner. Then, illumination light having passed through the microfilm is projected onto the back side of a reader screen (an optical diffusing plate) while being enlarged at a predetermined magnification by a reader part optical system composed of a projection lens, a prism lens and a plurality of fixed mirrors. Accordingly, it is made possible to observe the image in an enlarged manner from the front side of the reader screen (during a reader mode).

In a scanner unit of the microfilm scanner, there is disposed an image sensor. During the reader mode, the image sensor is located at an upper portion of the reader screen so as to be kept in such a position that the image sensor has retreated from an optical path for the projected illumination light.

Then, in a case where scanning is to be performed on an image of the microfilm projected on the reader screen in an enlarged manner, the scanner unit is moved to such a position as to intrude into the above-mentioned optical path on the reader screen, and, then, scanning is effected with image light being scanned (during a scanning mode).

In the above-described microfilm scanner, a condition of the scanning action for scanning the image is made to be set on the basis of a scanning condition inputted from an externally-connected host computer or a scanning condition inputted from a main body operation part disposed on the main body of the image reading apparatus.

In some cases, after a scanning condition has been set by the host computer, the content of the scanning condition may be changed by the main body operation part. If, in those cases, image scanning is performed in accordance with the scanning condition as changed by the main body operation part, a scanning operation acting contrary to the scanning condition set by the host computer would be effected.

If such a scanning operation is effected, there is a possibility that a trouble such as a mistake of the scanning size occurs, and in worst cases, image data is brought into a scrambled state. Therefore, the conventional image reading apparatus is arranged such that, if the host computer is externally connected thereto, every operation of the main body operation part is made invalid.

Since, if the host computer is externally connected to the image reading apparatus, every operation of the main body operation part disposed on the main body of the image reading apparatus is made invalid, the user has to go to the place of the host computer to operate the host computer even when making a slight change of the scanning condition. Therefore, there is a problem that the operation efficiency in setting a condition for image scanning is remarkably low.

Further, when forming image data by scanning a recording medium, the user sometimes decides a scanning size while viewing an image display screen, and sometimes sets the kind of a microfilm, such as a negative film or a positive film.

However, in the conventional image reading apparatus, since the above setting operations have to be performed at the host computer, the user must trouble to go to the place of the host computer to operate the host computer even for a slight setting operation. Therefore, there is a problem that the operation efficiency is remarkably low. Further, in a case where the user intends to perform the setting of the image reading apparatus while viewing the screen of the host computer with an image displayed on the screen of the host computer, it is necessary to perform such a troublesome operation to beforehand scan an image so as to make a preview picture.

BRIEF SUMMARY OF THE INVENTION

It is an object of the invention to provide an image reading apparatus, an image processing system and an operation control method, which are improved in operability.

To attain the above object, in accordance with an aspect of the invention, there is provided an image reading apparatus for performing a reading action of reading image information from a predetermined medium, comprising connection means capable of connecting a connection apparatus having a predetermined function to the image reading apparatus, operation means for giving an instruction for an action of the connection apparatus connected by the connection means and an instruction for the reading action, and change-over means for, on the basis of a connection state of the connection means or a state of the connection apparatus connected by the connection means, changing over a function of the operation means between functioning as means for giving the instruction for an action of the connection apparatus and functioning as means for giving the instruction for the reading action.

In accordance with another aspect of the invention, there is provided an image processing system composed of a plurality of connection apparatuses which are communicatably connected to one another, at least one of the plurality of connection apparatuses being an image reading apparatus for performing a reading action of reading image information from a predetermined medium, and comprising connection means capable of connecting a connection apparatus having a predetermined function to the image reading apparatus, operation means for giving an instruction for an action of the connection apparatus connected by the connection means and an instruction for the reading action, and change-over means for, on the basis of a connection state of the connection means or a state of the connection apparatus connected by the connection means, changing over a function of the operation means between functioning as means for giving the instruction for an action of the connection apparatus and functioning as means for giving the instruction for the reading action.

According to the above arrangement, the user is enabled to efficiently perform a working operation for image reading, print outputting, etc., without taking wasteful labor.

Further, it is another object of the invention to provide an image reading apparatus in which, if a scanning condition is to be changed slightly, such a change of the scanning condition can be performed by operating a main body operation part disposed on the image reading apparatus.

To attain the above object, in accordance with a further aspect of the invention, there is provided an image reading apparatus, comprising scanning means for obtaining image data by sequentially transporting a plurality of images formed on a recording medium to a predetermined position and scanning each image transported to the predetermined position, and scanning-condition setting means for setting a condition for scanning the image on the basis of a scanning condition inputted from a host computer connected to the image reading apparatus or a scanning condition inputted from a main body operation part disposed on the image reading apparatus, wherein, after the host computer has started an image scanning action, the scanning-condition setting means causes the scanning means to scan the image in accordance with the scanning condition set by the host computer, irrespective of the scanning condition inputted from the main body operation part.

In accordance with a further aspect of the invention, there is provided an image reading apparatus, comprising scanning means for obtaining image data by sequentially transporting a plurality of images formed on a recording medium to a predetermined position and scanning each image transported to the predetermined position, and scanning-condition setting means for setting a condition for scanning the image on the basis of a scanning condition inputted from a host computer connected to the image reading apparatus or a scanning condition inputted from a main body operation part disposed on the image reading apparatus, wherein, if it is possible to scan the image even after the host computer has started an image scanning action, the scanning-condition setting means causes the scanning means to scan the image in accordance with the scanning condition set by the main body operation part.

In accordance with a further aspect of the invention, there is provided an image reading apparatus, comprising scanning means for obtaining image data by scanning an image formed on a recording medium, and scanning-condition setting means for setting a condition for scanning the image on the basis of a scanning condition inputted from a host computer connected to the image reading apparatus or a scanning condition inputted from a main body operation part disposed on the image reading apparatus, wherein, after the host computer has started an image scanning action, the scanning-condition setting means causes the scanning means to scan the image in accordance with the scanning condition set by the host computer, irrespective of the scanning condition inputted from the main body operation part.

In accordance with a further aspect of the invention, there is provided an image reading apparatus, comprising scanning means for obtaining image data by scanning an image formed on a recording medium, and scanning-condition setting means for setting a condition for scanning the image on the basis of a scanning condition inputted from a host computer connected to the image reading apparatus or a scanning condition inputted from a main body operation part disposed on the image reading apparatus, wherein, if it is possible to scan the image even after the host computer has started an image scanning action, the scanning-condition setting means causes the scanning means to scan the image in accordance with the scanning condition set by the main body operation part.

According to the above arrangement, it becomes possible to perform the setting of scanning in the neighborhood of the image reading apparatus. Thus, it is possible to omit such a trouble to go to the place of the host computer for the purpose of making a slight change of the setting condition, so that the working efficiency can be improved. Further, even if the scanning condition is changed by operating the main body operation part after the host computer has started an image scanning action, it is possible to effectively prevent a scanning action which is not recognized by the host computer from being performed. By this arrangement, it is surely possible to prevent such a trouble that the host computer mistakes the scanning size, and, therefore, it is possible to prevent such a trouble that image data is brought into a scrambled state due to the error in scanning size.

It is a further object of the invention to provide an image reading apparatus capable of making it possible for the user to perform the various types of setting in image setting while viewing an image display screen.

To attain the above object, in accordance with a further aspect of the invention, there is provided an image reading apparatus having an image display screen and arranged to display, on the image display screen, an image formed on a recording medium and to scan the image so as to form image data, the image reading apparatus comprising an operation part for setting a condition relating to scanning of the image, and setting-content information means for transmitting a content set by the operation part to a host computer which is externally connected to the image reading apparatus.

In accordance with a further aspect of the invention, there is provided an image reading system composed of an image reading apparatus comprising image data forming means for displaying, on an image display screen, an image formed on a recording medium and for scanning the image to form image data, an operation part for setting a condition relating to scanning of the image, and setting-content information means for transmitting a content set by the operation part to a host computer which is externally connected to the image reading apparatus, and the host computer for controlling a scanning action of the image reading apparatus on the basis of information transmitted from the setting-content information means.

According to the above arrangement, it is possible for the host computer to always grasp the content set by the operation part. In addition, even if the host computer is in a state of being connected to the image reading apparatus, it is possible for the user to perform the various kinds of setting by operating the operation part. Further, it is possible to greatly improve the efficiency of the various working operations which are performed with the host computer viewed by the user.

These and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 5A and 5B are diagrams for explaining the relationship between the setting of the printer status and the connection state of a printer.

DETAILED DESCRIPTION OF THE INVENTION

Hereinafter, preferred embodiments of the invention will be described in detail with reference to the drawings.

First Embodiment

Figure 1:
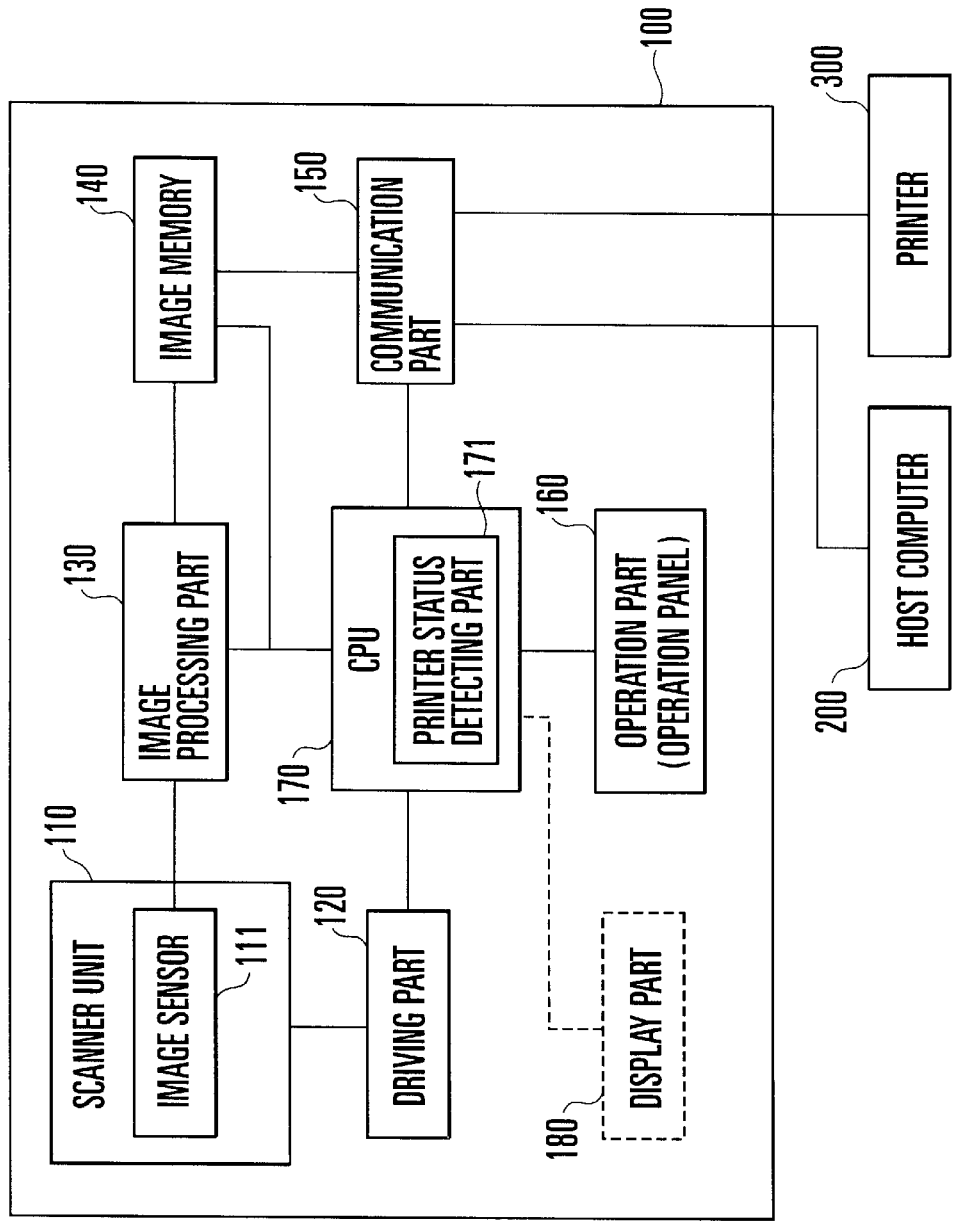
FIG. 1 is a block diagram showing the arrangement of an image reading apparatus according to a first embodiment of the invention.

A first embodiment of the invention is applied to, for example, an image reading apparatus 100 as shown in FIG. 1.

The image reading apparatus 100 is arranged to include, as shown in FIG. 1, a scanner unit 110 arranged to scan an original set thereon using an image sensor 111 so as to obtain image information from the original, a driving part 120 for the scanner unit 110, an image processing part 130 arranged to perform image processing, such as gradation conversion, image combining, etc., on the image information obtained by the scanner unit 110, an image memory 140 arranged to store therein image information obtained after the image processing by the image processing part 130, a communication part 150 arranged to communicate with a host computer (personal computer) 200 and a printer 300, which are connectable to the main body of the image reading apparatus 100, an operation part (operation panel) 160 arranged to perform the various kinds of setting for reading image information, and a CPU 170 arranged to preside over the action of the whole image reading apparatus 100.

The image reading apparatus 100 having the above construction is arranged to operate in accordance with an instruction from the host computer 200 as well as in accordance with an instruction from the operation part 160.

In particular, the operation part 160 is arranged to automatically change over the function thereof between functioning as an operation part for a printer and functioning as an operation part for a scanner, on the basis of the connection state or the power supply state of the printer 300. Such an arrangement of the operation part 160 is one of the most characteristic features of the first embodiment of the invention.

Figure 2:
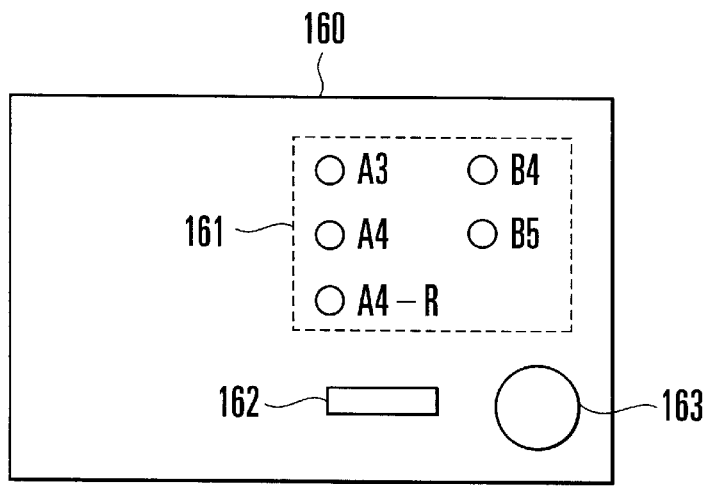
FIG. 2 is a diagram for explaining an operation part disposed on a main body of the image forming apparatus according to the first embodiment of the invention.

The operation part 160 in the first embodiment is provided with, for example, as shown in FIG. 2, a size designating part 161 for designating a paper size or a scanning area size, and a button 162 operable for selecting and deciding the size to be designated in the size designating part 161.

The size designating part 161 is arranged to allow one of the sizes of "A3", "A4", "A4-R", "B4" and "B5" to be selected by the button 162. For example, if the size of "A3" is selected and decided by the button 162, an LED (a portion indicated by "◯") corresponding to A3 in the size designating part 161 is lighted up.

Accordingly, the function of the size designating part 161 is automatically changed over between a function of designating the fixed-form size of a scanning area in the image reading apparatus 100 and a function of designating the size of a paper sheet for printing-out in the printer 300, on the basis of a connection state or a power-supply state of the printer 300.

Figure 3:
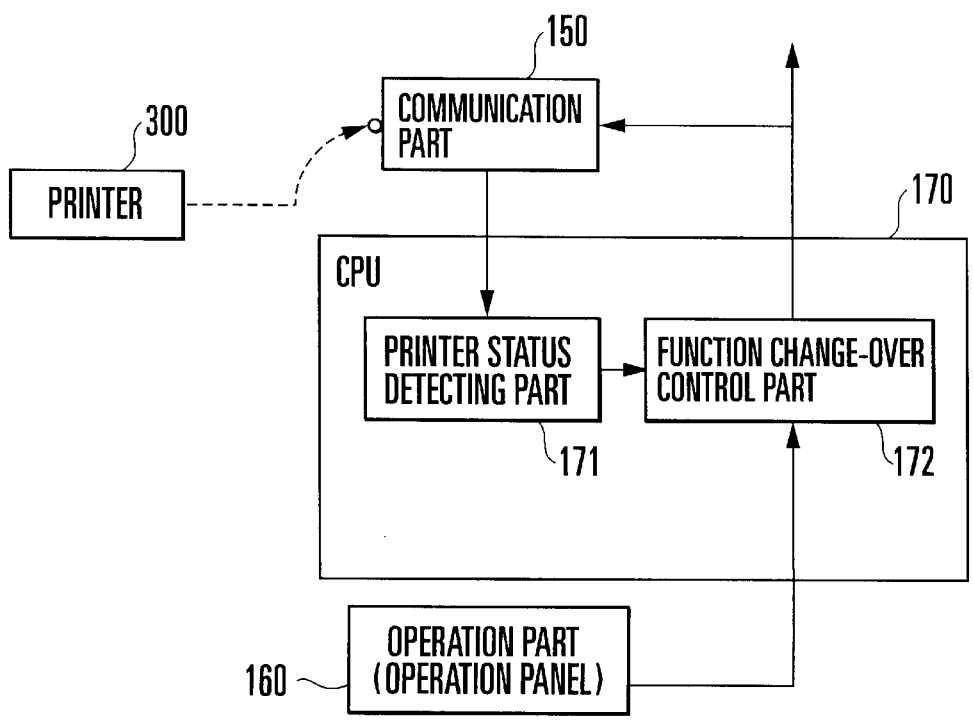
FIG. 3 is a block diagram for explaining the arrangement of a portion which is most characteristic in the image forming apparatus according to the first embodiment of the invention.

Then, in order to realize the above arrangement of the operation part 160, the CPU 170 is made to include, for example, as shown in FIG. 3, a printer status detecting part 171 for detecting the connection state or the power-supply on/off-state of the printer 300 through the communication part 150, and a function change-over control part 172 for performing such control as to change over the function of the operation part 160 on the basis of a result of detection obtained by the printer status detecting part 171.

The CPU 170 executes a processing program, for example, according to flow charts shown in FIG. 4 and FIGS. 6 to 8, in accordance with an operation mode as beforehand set. By this arrangement, the image reading apparatus 100 operates as described in the following.

Incidentally, a display part 180 indicated by the dotted line in FIG. 1 and a portion denoted by reference numeral 163 in FIG. 2 will be described later.

Further, the above operation mode may be arranged to be settable by a setting switch (not shown) in the operation part 160 or may be arranged to be settable by the host computer 200.

Figure 4:
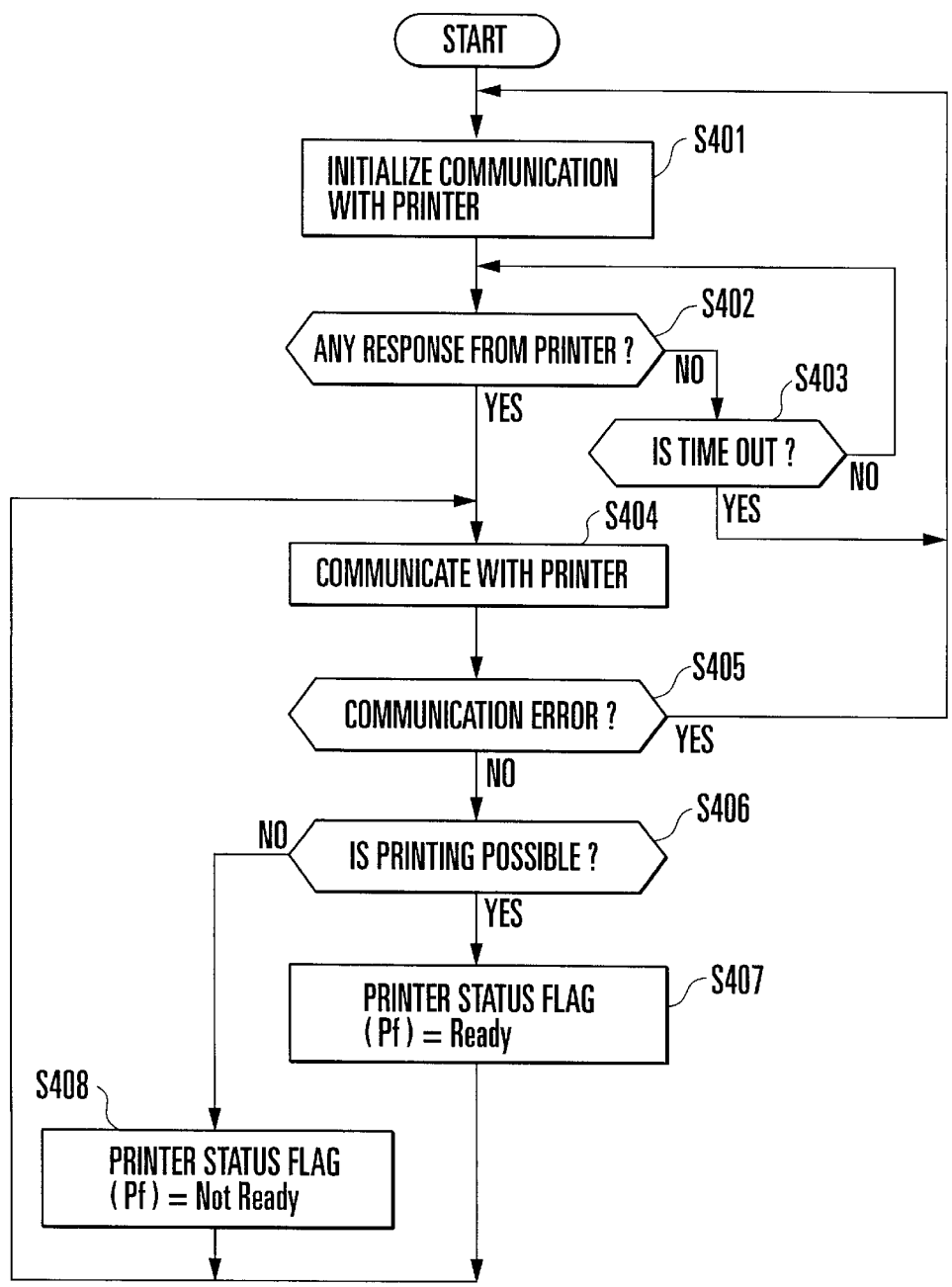
FIG. 4 is a flow chart for explaining the action (the setting of a printer status) of the image forming apparatus according to the first embodiment of the invention.

(i) Printer Status Setting Process (see FIG. 4).

First, the CPU 170 performs an initializing process on communication with the printer 300 by the communication part 150 (step S401).

Then, the CPU 170 determines whether any response has been received from the printer 300 through the communication part 150 (step S402).

If it is found, as a result of determination in the step S402, that no response has been received from the printer 300, the CPU 170 determines whether a predetermined period of time has elapsed at an internal timer (not shown), i.e., whether the time counted by the internal timer has become out, (step S403). After the lapse of the predetermined period of time, the CPU 170 determines again whether any response has been received from the printer 300 (step S402).

If it is found, as a result of determination in the step S402, that a response has been received from the printer 300, the CPU 170 communicates with the printer 300 through the communication part 150 (step S404).

The CPU 170 determines whether any communication error has occurred as a result of communication in the step S404 (step S405).

If it is found, as a result of determination in the step S405, that a communication error has occurred, the CPU 170 returns the flow to the step S401, and performs again the initializing process on communication with the printer 300 to repeat the steps subsequent to the step S401.

If it is found, as a result of determination in the step S405, that no communication error has occurred, the CPU 170 determines whether printing at the printer 300 is possible (step S406).

If it is found, as a result of determination in the step S406, that printing at the printer 300 is possible, the CPU 170 sets a printer status flag Pf to "Ready" which indicates that the printer 300 is in a ready state (step S407). Accordingly, if the printer 300 is connected to the main body of the image reading apparatus 100 and a communicatable state is established between the main body of the image reading apparatus 100 and the printer 300, the printer status flag Pf is set to "Ready", as shown in FIG. 5A.

On the other hand, if it is found, as a result of determination in the step S406, that printing at the printer 300 is not possible, the CPU 170 sets the printer status flag Pf to "Not Ready" which indicates that the printer 300 is not in the ready state (step S408). Accordingly, if the host computer 200, instead of the printer 300, is connected to the main body of the image reading apparatus 100, the printer status flag Pf is set to "Not Ready", as shown in FIG. 5B.

The printer status flag Pf which is set in the step S407 or the step S408 is taken into consideration by the printer status detecting part 171, as will be described later.

Figure 6:
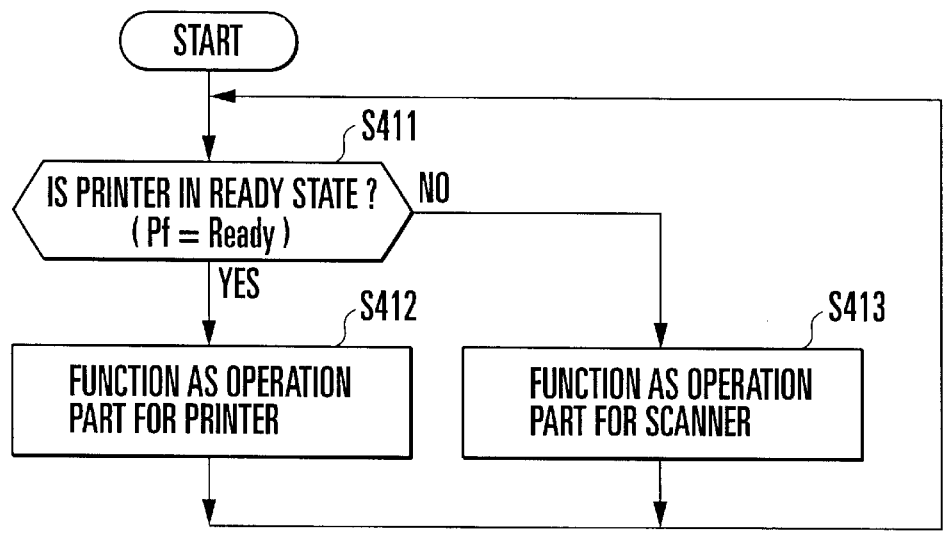
FIG. 6 is a flow chart for explaining the action (the automatic change-over of the function of the operation part) of the image forming apparatus according to the first embodiment of the invention.

(ii) Case Where the Operation Mode is Set to an Automatic Change-over Mode (see FIG. 6).

First, the CPU 170 determines whether the printer 300 is currently in the ready state (Pf=Ready), by taking into consideration the printer status flag Pf set in the printer status setting process described above (see FIG. 4) (step S411).

If it is found, as a result of determination in the step S411, that the printer 300 is in the ready state, the function change-over control part 172 performs such control as to cause the operation part 160 to function as an operation part for a printer (step S412). In other words, the function change-over control part 172 regards the various kinds of instructions from the operation part 160 as instructions for operating the printer 300, and gives instructions to the printer 300 so as to cause the printer 300 to operate according to those instructions. By this arrangement, for example, if the size of "A3" is selected and decided at the size designating part 161 of the operation part 160 (see FIG. 2), printing-out using paper sheets of the size of "A3" is performed at the printer 300.

On the other hand, if it is found, as a result of determination in the step S411, that the printer 300 is not in the ready state, the function change-over control part 172 performs such control as to cause the operation part 160 to function as an operation part for a scanner (step S413). In other words, the function change-over control part 172 regards the various kinds of instructions from the operation part 160 as instructions for operating the image reading apparatus 100, and gives instructions to the various parts of the image reading apparatus 100 so as to cause the image reading apparatus 100 to operate according to those instructions. By this arrangement, for example, if the size of "A3" is selected and decided at the size designating part 161 of the operation part 160 (see FIG. 2), a scanning action in the scanning area size of "A3" is performed at the scanner unit 110, so that image information in that size is taken in.

Figure 7:
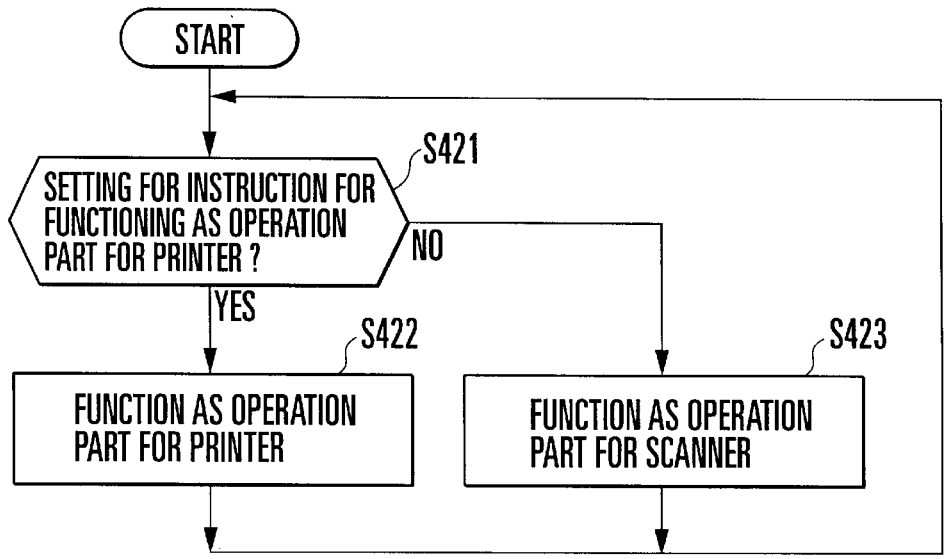
FIG. 7 is a flow chart for explaining the action (the manual change-over 1 of the function of the operation part) of the image forming apparatus according to the first embodiment of the invention.

(iii) Case 1 Where the Operation Mode is Set to a Manual Change-over Mode (see FIG. 7).

First, the printer status detecting part 171 determines whether the setting for instructing the operation part 160 to function as an operation part for a printer has been set (step S421).

Incidentally, the setting for designating the function of the operation part 160 may be performed, for example, by a setting switch (not shown) of the operation part 160, or may be performed by the host computer 200.

If it is found, as a result of determination in the step S421, that the setting for instructing the operation part 160 to function as an operation part for a printer has been set, the function change-over control part 172 performs such control as to cause the operation part 160 to function as an operation part for a printer, as in the step S412 (step S422).

On the other hand, if it is found, as a result of determination in the step S421, that the setting for instructing the operation part 160 to function as an operation part for a printer has not been set, the function change-over control part 172 performs such control as to cause the operation part 160 to function as an operation part for a scanner, as in the step S413 (step S423).

Figure 8:
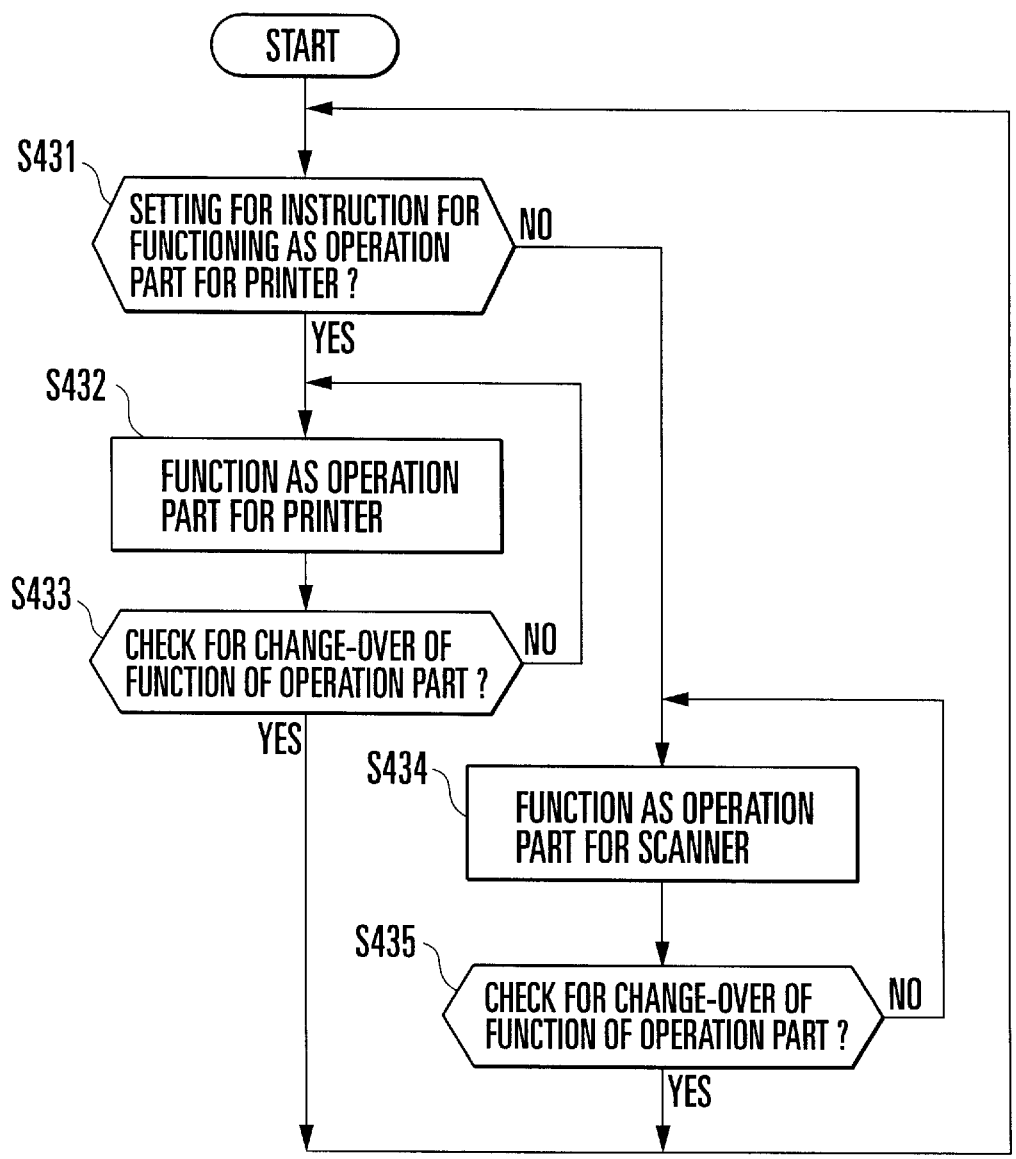
FIG. 8 is a flow chart for explaining the action (the manual change-over 2 of the function of the operation part) of the image forming apparatus according to the first embodiment of the invention.

(iv) Case 2 Where the Operation Mode is Set to the Manual Change-over Mode (see FIG. 8).

First, the printer status detecting part 171 determines whether the setting for instructing the operation part 160 to function as an operation part for a printer has been set, as in the step S421 (step S431).

If it is found, as a result of determination in the step S431, that the setting for instructing the operation part 160 to function as an operation part for a printer has been set, the function change-over control part 172 performs such control as to cause the operation part 160 to function as an operation part for a printer, as in the step S422 (step S432).

Then, the printer status detecting part 171 makes a check to find if a change-over of the function of the operation part 160 has been performed (step S433). Only if it is found, as a result of check in the step S433, that the change-over has been performed, the flow returns to the step S431 to repeat the step S431 and steps subsequent thereto. If it is found, as a result of check in the step S433, that the change-over has not been performed, the flow returns to the step S432 to continue executing a processing step (step S432) for performing such control as to cause the operation part 160 to function as an operation part for a printer.

On the other hand, if it is found, as a result of determination in the step S431, that the setting for instructing the operation part 160 to function as an operation part for a printer has not been set, the function change-over control part 172 performs such control as to cause the operation part 160 to function as an operation part for a scanner, as in the step S423 (step S434).

Then, the printer status detecting part 171 makes a check to find if a change-over of the function of the operation part 160 has been performed (step S435). Only if it is found, as a result of check in the step S435, that the change-over has been performed, the flow returns to the step S431 to repeat the step S431 and steps subsequent thereto. If it is found, as a result of check in the step S435, that the change-over has not been performed, the flow returns to the step S434 to continue executing a processing step (step S434) for performing such control as to cause the operation part 160 to function as an operation part for a scanner.

As described above, according to the first embodiment, the operation part 160 is provided on the main body of the image reading apparatus and the function of the operation part 160 is automatically changed over in accordance with the connection state or the power-supply state of the printer 300. Accordingly, it is possible to perform the various operations for reading image information and the operation for printing-out at the printer, by operating the operation part 160 provided on the main body of the image reading apparatus 100. In other words, the single operation part 160 is made to have both the function as an operation part for the image reading apparatus 100 and the function as an operation part for the printer 300, and these functions are changed over in accordance with the connection state (or the power-supply on/off-state) of the printer 300. Accordingly, it is possible to simplify the structure of the image reading apparatus 100, and it is possible for the user to perform the various operations for reading and outputting image information at the setting place of the image reading apparatus 100.

Further, even if the operation part 160 has been automatically changed over to function as an operation part for a printer during the automatic change-over mode when the printer 300 is in the ready state, it is possible to cause the operation part 160 to function as an operation part for a scanner, by changing over the operation mode to the manual change-over mode according to necessity.

Accordingly, in accordance with the first embodiment, it is possible for the user to perform operations for the various kinds of processing only at the setting place of the image reading apparatus, without coming and going between the image reading apparatus and the personal computer as in the conventional image reading apparatus. Therefore, the user can efficiently perform working operations for reading and outputting image information without taking any wasteful labor.

In addition, in the above-described first embodiment, the display part 180 for displaying image information obtained by the scanner unit 110 may be additionally provided as indicated by the dotted line in FIG. 2. By this arrangement, it is possible for the user to confirm image information read by the scanner unit 110 at the setting place of the image reading apparatus 100, and it is possible for the user to perform the various setting operations on the operation part 160, including selecting and deciding a scanning area size.

Further, for example, a trimming key, as indicated by reference numeral 163 in FIG. 2, for designating the scanning area size to an arbitrary size may be provided. By this arrangement, it is possible to select the scanning area of an arbitrary size, instead of the fixed-form size such as "A3" or "A4", and it is also possible to print out an image of the arbitrary size.

Second Embodiment

Figure 9:
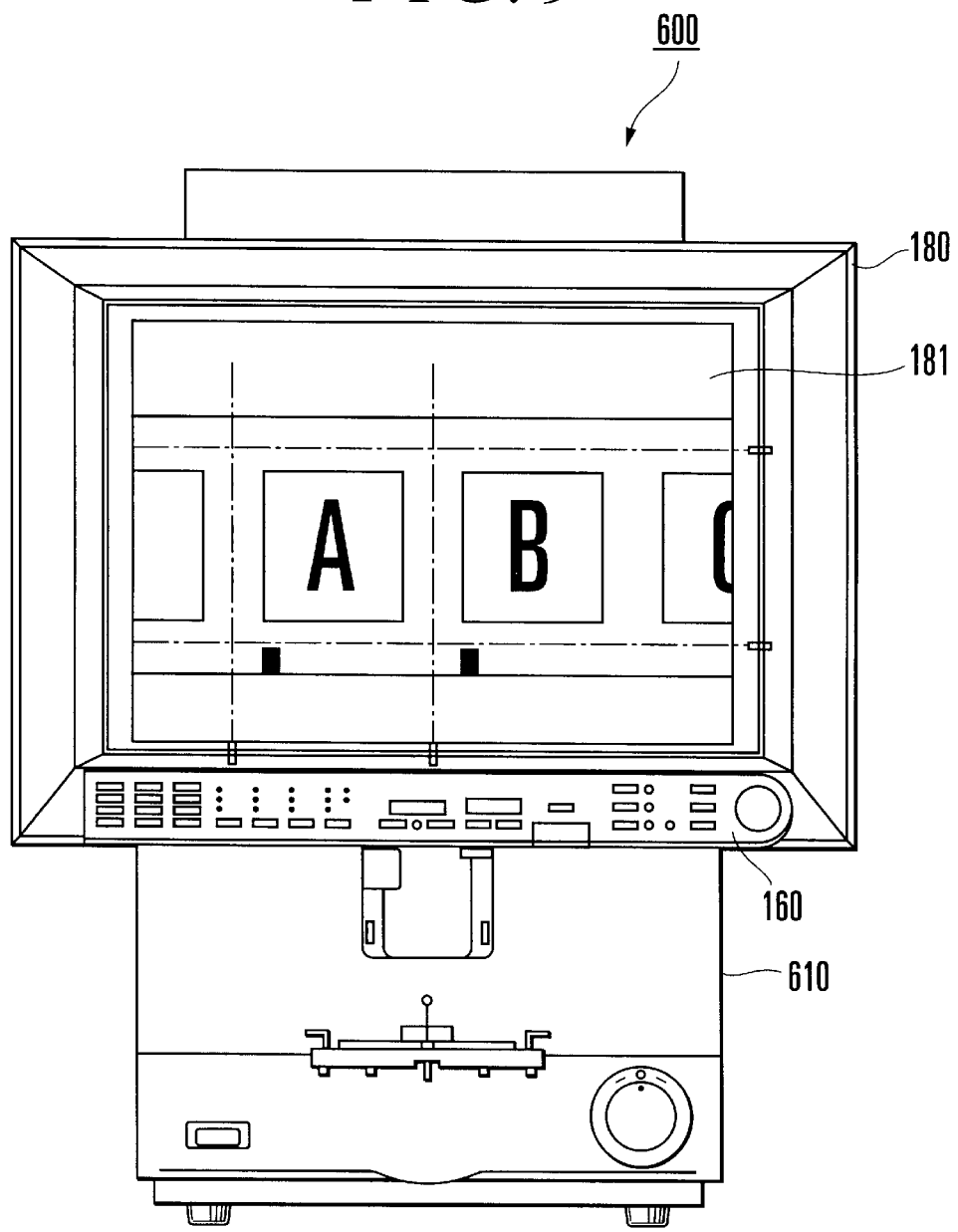
FIG. 9 is a diagram for explaining the arrangement of a microfilm scanner according to a second embodiment of the invention.

According to a second embodiment of the invention, the structure employed in the above-described first embodiment is applied to, for example, a microfilm scanner 600, as shown in FIG. 9, for reading and outputting image information of a microfilm.

In the microfilm scanner 600 shown in FIG. 9, portions functioning in the same manner as in the image reading apparatus shown in FIG. 1 are denoted by the same reference numerals as in FIG. 1, and are, therefore, omitted from the following description.

The microfilm scanner 600 is provided with, as shown in FIG. 9, a display part 180 having a screen (reader screen) 181, an operation part 160, and a roll film carrier 610, and is arranged to be connectable to a host computer 200 or a printer 300, which is a connection apparatus such as that shown in FIG. 1.

The internal arrangement of the microfilm scanner 600 is the same as that shown in FIG. 1 (the display part 180 being additionally provided). By this arrangement, as described in the foregoing, the function of the operation part 160 provided on the main body of the microfilm scanner 600 is able to be automatically changed over between the function as an operation part for a printer and the function as an operation part for a scanner, according to a connection state (or a power-supply state) of the printer.

Figure 10:
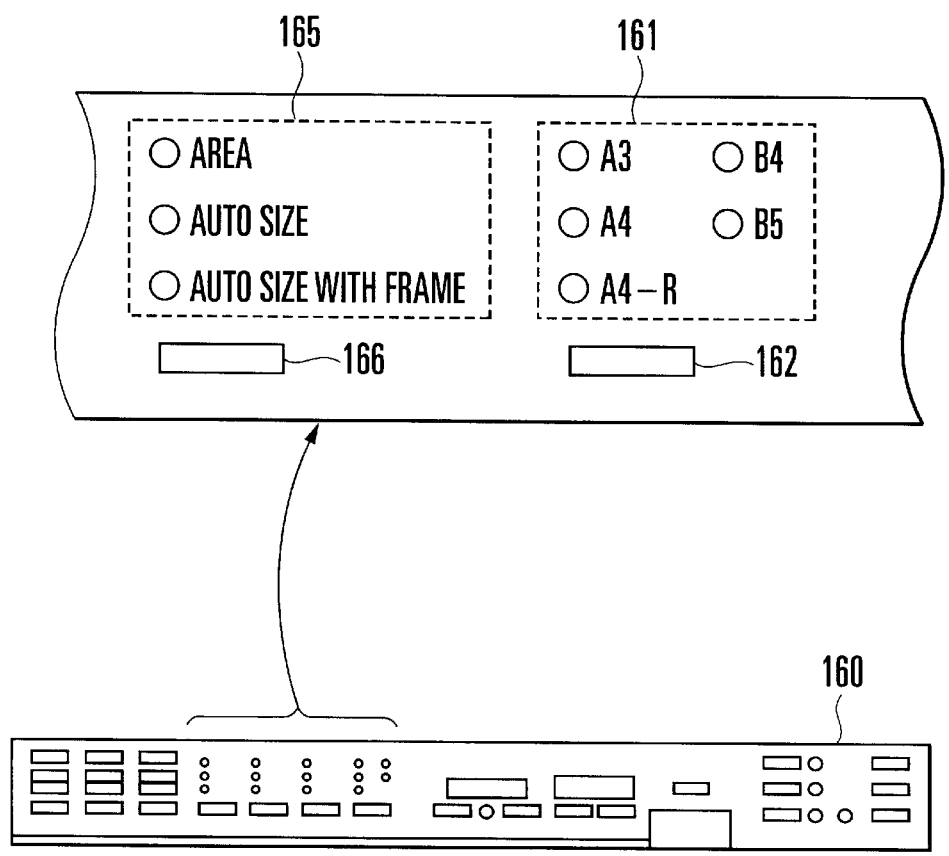
FIG. 10 is a diagram for explaining an operation part disposed on the microfilm scanner according to the second embodiment of the invention.

The operation part 160 is arranged to include, as shown in FIG. 10, a size designating part 161 and a button 162, which are the same as those shown in FIG. 2, a scanning area designating part 165 for designating a method of designating a scanning area, and a button 166 for selecting and deciding the scanning area designating method in the scanning area designating part 165.

The scanning area designating part 165 is arranged to allow one of scanning area designating methods of "area", "auto size" and "auto size with frame" to be selected by the button 166. For example, the method of "area" is selected and decided by the button 166, an LED (a portion indicated by "○") corresponding to "area" in the scanning area designating part 165 is lighted up.

On the screen 181 of the display part 180, an image recorded on the film is projected by the following arrangement.

Figure 11:
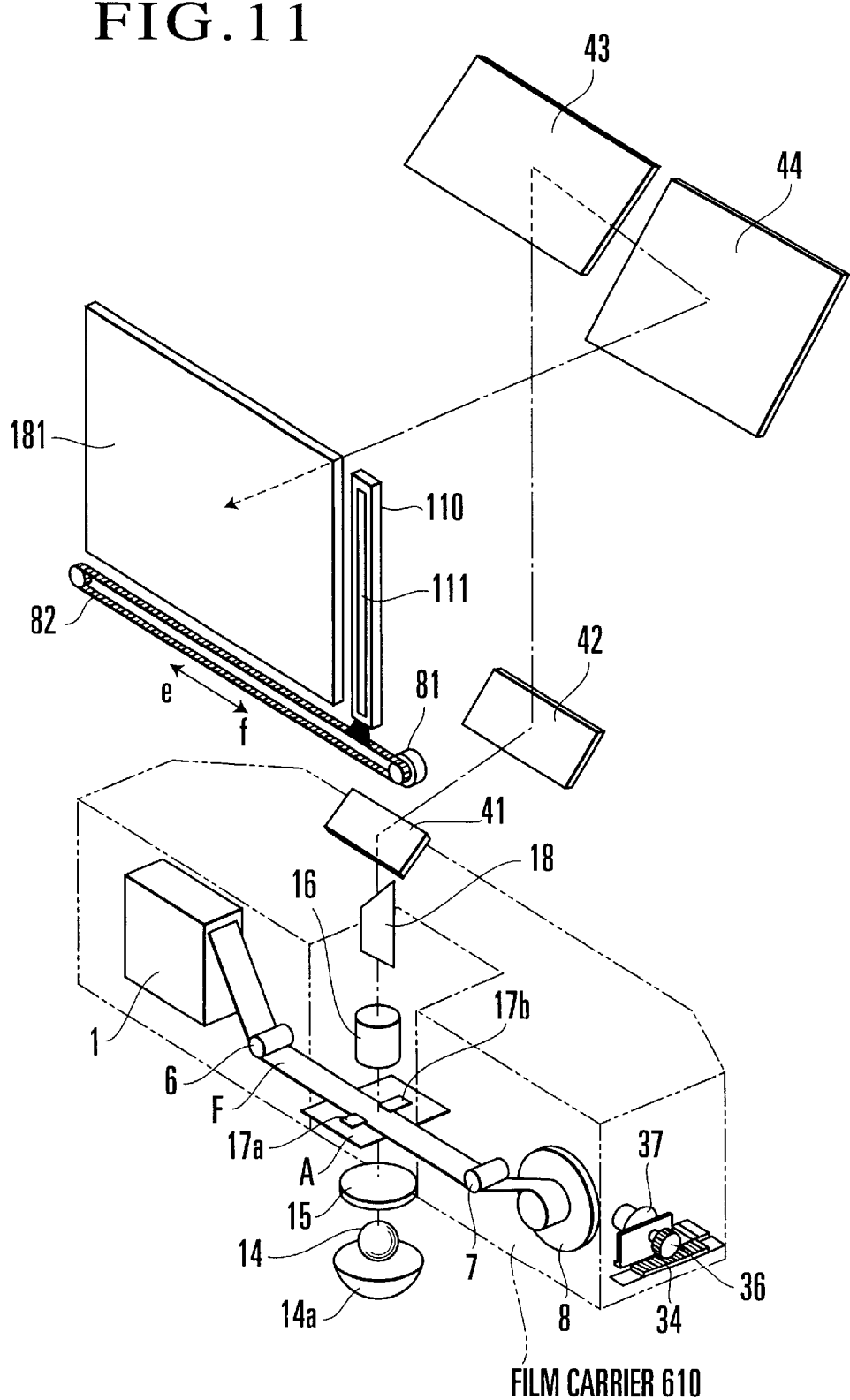
FIG. 11 is a diagram for explaining the action of the microfilm scanner during a reader mode and during a scanning mode.
Figure 12A:
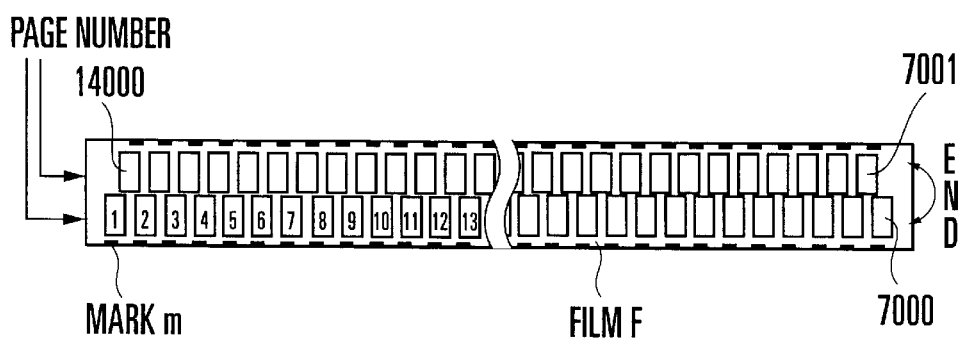
FIGS. 12A, 12B and 12C are diagrams for explaining examples of films for use in the microfilm scanner.
Figure 12B:
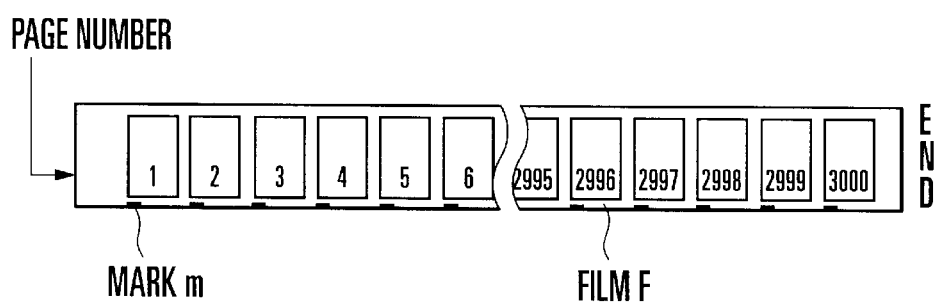
Figure 12C:
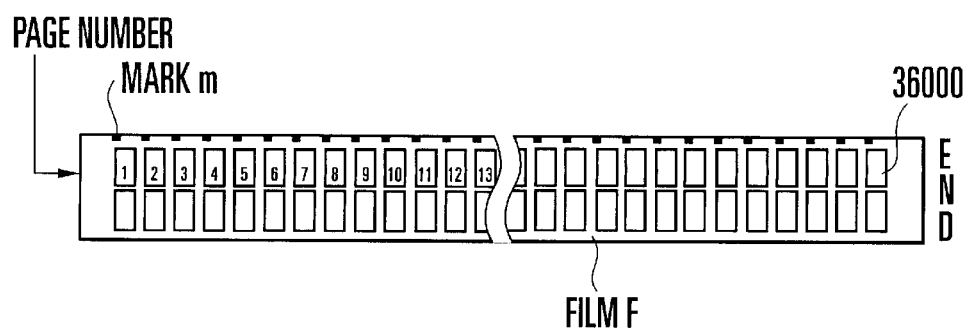
Figure 13:
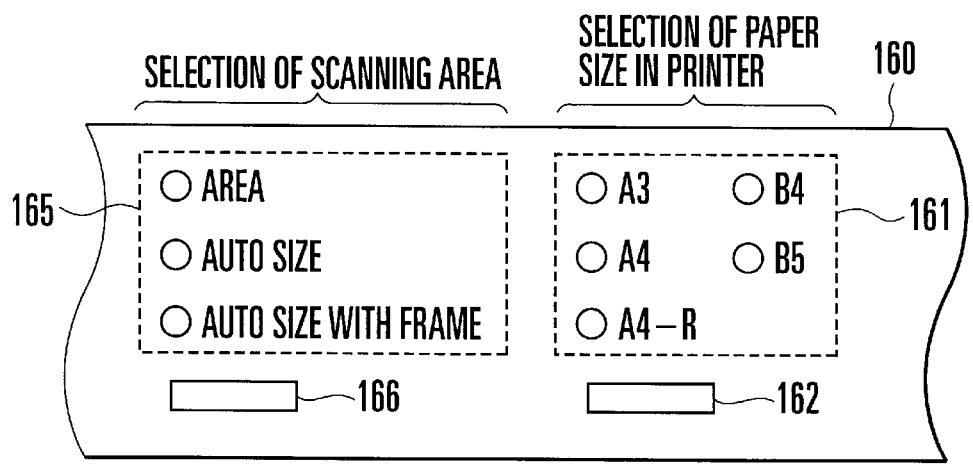
FIG. 13 is a diagram for explaining a case where the operation part functions as an operation part for the printer.
Figure 14:
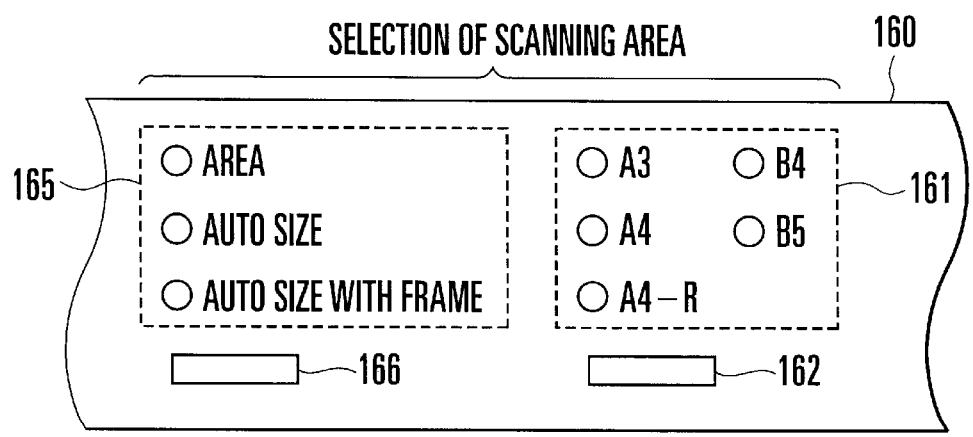
FIG. 14 is a diagram for explaining a case where the operation part functions as an operation part for the scanner.

For example, as shown in FIG. 11, first, a desired image frame portion (hereinafter referred to as a target image frame portion) of the roll microfilm F is placed on a projection glass part A serving as a projection position, in accordance with an automatic image frame searching function of the film carrier 610. As the microfilm F, there can be used such films as those shown in FIGS. 12A to 12C.

The target image frame portion placed on the projection glass part A is illuminated from the bottom side thereof by an illumination system, which is disposed below the projection glass part A and includes a light source lamp 14, a spherical mirror 14a, a condenser lens 15, etc.

Illumination light having passed through the target image frame portion is projected and imaged on the back side of the reader screen (light-diffusing plate) 181 while being enlarged at a predetermined magnification, by a reader-part optical system including a projection lens 16, a prism lens 18 and fixed mirrors 41 to 44.

Accordingly, an image (microfilm image) of the target image frame portion can be viewed, as an enlarged image, from the front side of the reader screen 181.

Meanwhile, an image sensor 111 is disposed on the scanner unit 110. The image sensor 111 is mounted on a belt 82. The belt 82 is arranged to move in directions "e" and "f" according to the driving of a motor 81. Then, during the above action of projecting the target image frame portion onto the reader screen 181 (reader mode), the scanner unit 110 is kept in such a position as to retreat from an optical path of the reader screen 181, by the belt 82 and the motor 81.

During an action of scanning the microfilm image projected on the reader screen 181 in an enlarged manner (scanning mode), the motor 81 is driven in response to an instruction for scanning from the operation part 160 or the like, so that the belt 82 connected to the motor 81 is moved in the directions "e" and "f". Accordingly, the scanner unit 110 is moved in the directions "e" and "f" while intruding into the above optical path, so that image light is scanned.

In the microfilm scanner 600 having the above construction, when the processing operations shown in FIG. 4 and FIGS. 6 to 8 are effected with the arrangement shown in FIG. 3, if the printer 300 is in the ready state, the operation part 160 is made to function as an operation part for a printer. That is, the size designating part 161 and the button 162 function as an operation part for designating the paper size (the size of sheets of paper to be fed) for printing-out.

Alternatively, if the printer 300 is not in the ready state, the operation part 160 is made to function as an operation part for a scanner. That is, the size designating part 161 and the button 162 as well as the scanning area designating part 165 and the button 166 function as an operation part for designating the scanning area.

As described above, according to the second embodiment, the arrangement of the first embodiment is applied to the microfilm scanner 600 having the reader screen 181, so that the various kinds of setting for reading and outputting image information can be performed at the setting place of the microfilm scanner 600. By this arrangement, it is possible for the user to perform the various kinds of setting for image scanning and outputting, while confirming a microfilm image of each target frame portion on the reader screen 181, at the setting place of the microfilm scanner 600. In particular, in the case of scanning of microfilms, such a working operation as to read each target frame portion while replacing microfilms is frequently performed. However, according to the second embodiment, it is not necessary for the user to come and go between the personal computer and the microfilm scanner at the time of replacement of microfilms, and it is possible for the user to perform all the various operations for the replacement of microfilms, the confirmation of an image on the microfilm, the reading and outputting of an image, etc., at the setting place of the microfilm scanner. Therefore, the operability of the microfilm scanner 600 can be further improved.

Figure 15:
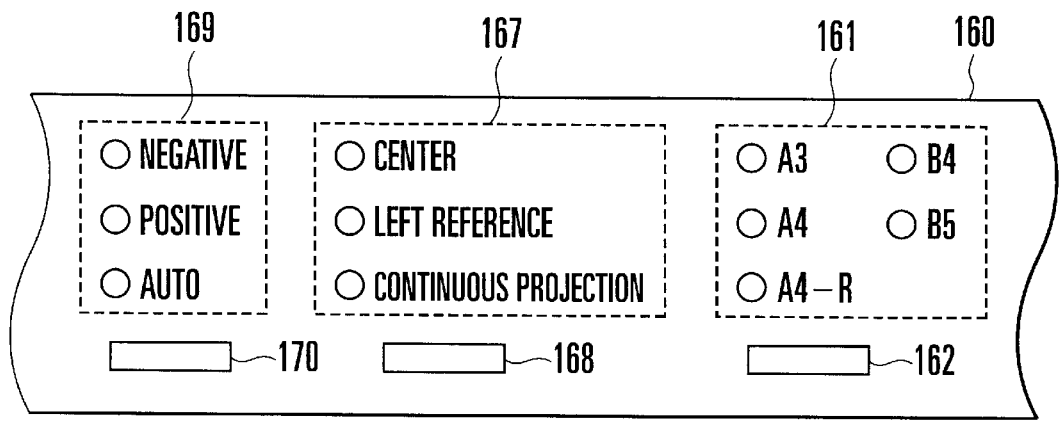
FIG. 15 is a diagram showing another example of the arrangement of the operation part.
Figure 16:
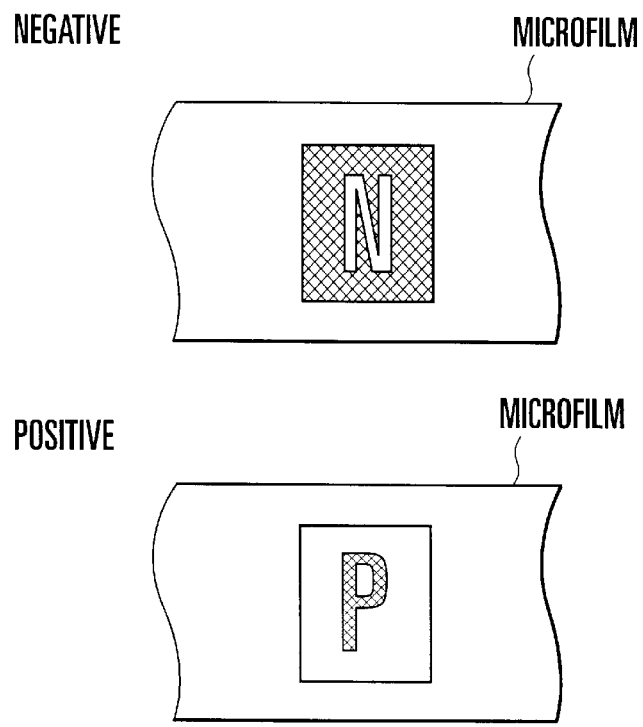
FIG. 16 is a diagram for explaining the designation of the kind of film in the operation part.

In addition, in the second embodiment, the operation part 160 may be further provided with, for example, as shown in FIG. 15, a projection position designating part 167 for designating a reference position used for projecting an image frame portion onto the display part 180 (the reader screen 181), a button 168 for selecting and deciding the projection reference position in the projection position designating part 167, a film designating part 169 for designating whether the target film is a negative film or a positive film as shown in FIG. 16, and a button 170 for selecting and deciding the kind of a film in the film designating part 169.

More specifically, the projection position designating part 167 is arranged to allow one of projection reference positions of "center", "left reference" and "continuous projection" to be selected by the button 168. Further, the film designating part 169 is arranged to allow one of the kinds of films of "negative", "positive" and "auto" to be selected by the button 170.

Figure 17:
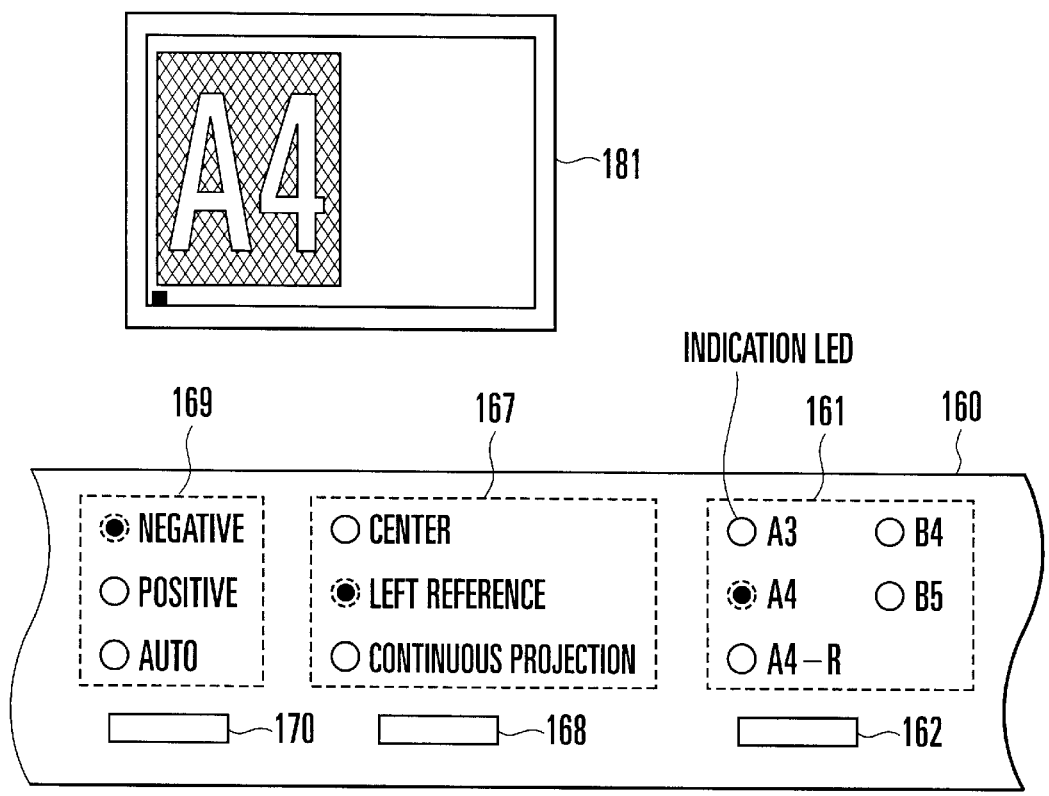
FIG. 17 is a diagram for explaining the state of an image projected onto a screen as a result of the designation at the operation part.
Figure 18A:
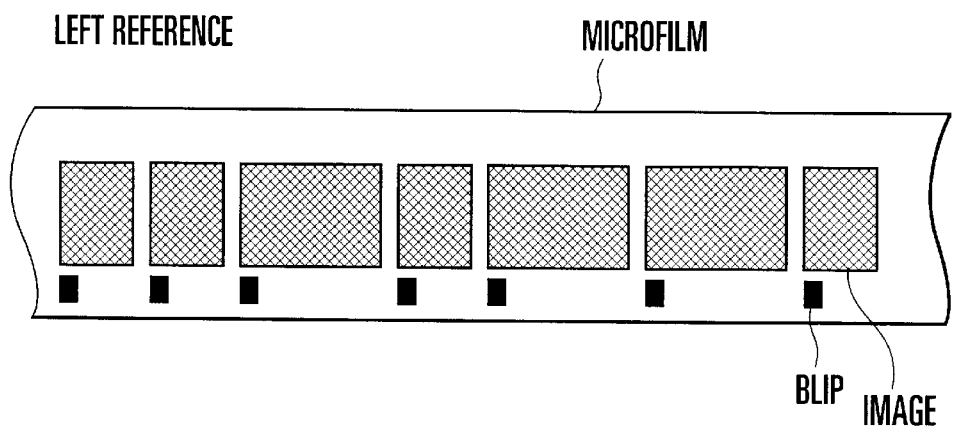
FIGS. 18A, 18B and 18C are diagrams for explaining the designation of a reference position for projection of an image on the screen at the operation part.
Figure 18B:
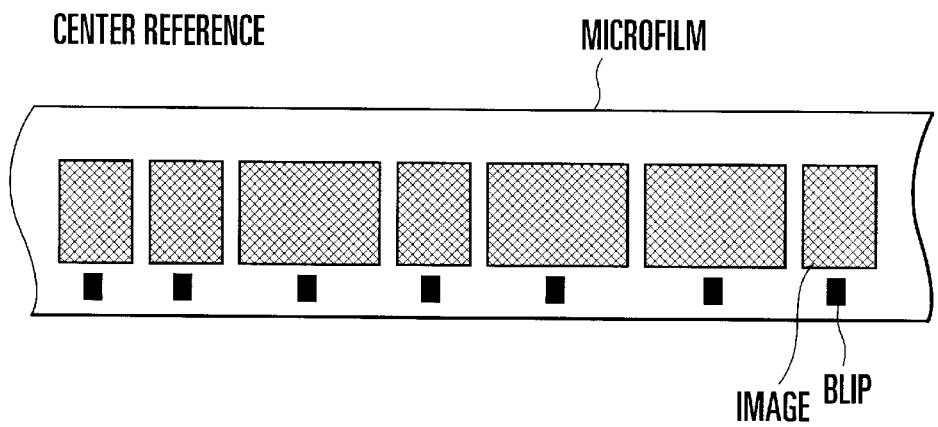
Figure 18C:
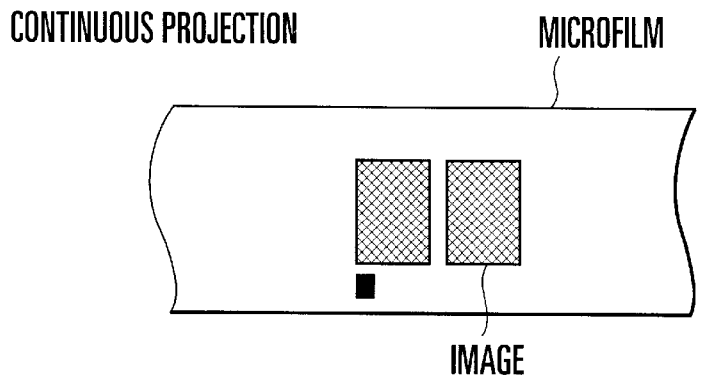
Figure 19:
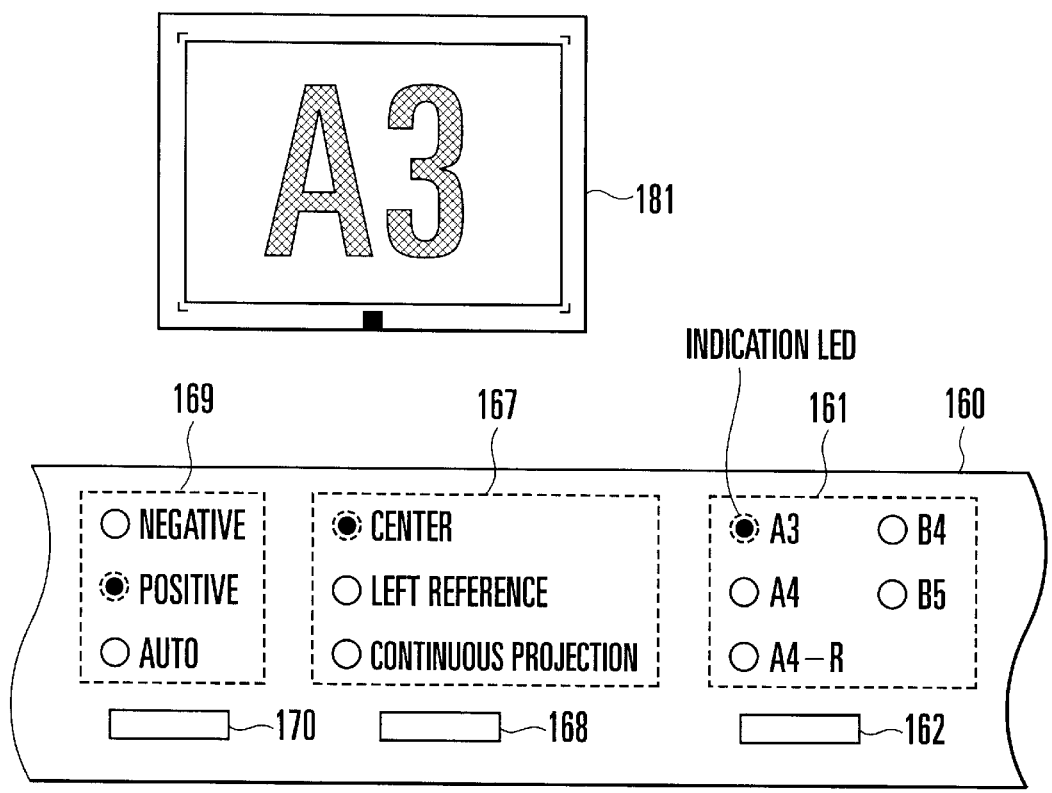
FIG. 19 is a diagram for explaining the state of an image projected on the screen as a result of the designation at the operation part.

By this arrangement, in a case where the operation part 160 functions as an operation part for a scanner when the printer is not in the ready state, if, as shown in FIG. 17, the kind of "negative" is selected as the film, the position of "left reference" is selected as the projection reference position and the fixed-form size of "A4" is selected as the scanning area size, each image frame portion of the film is projected on the reader screen 181 in the A4 size with the left reference position, as shown in FIG. 18A. Further, if, as shown in FIG. 19, the kind of "positive" is selected as the film, the position of "center" is selected as the projection reference position and the fixed-form size of "A3" is selected as the scanning area size, each image frame portion of the film is projected on the reader screen 181 in the A3 size with the center reference position, as shown in FIG. 18B. In addition, if the position of "continuous shooting" is selected as the projection reference position, each image frame portion of the film is continuously projected on the reader screen 181, as shown in FIG. 18C. Furthermore, if the kind of "auto" is selected as the film, the microfilm scanner 600 automatically detects the kind of film, and a projection operation corresponding to the detected kind of film is performed.

As has been described above, the main body of an image reading apparatus is provided with an operation means, and the function of the operation means is arranged to be automatically changed over, on the basis of a connection state of a connection apparatus (such as a printer) or a state of the connection apparatus (the state indicating whether the connection state is an operable state with the power supply turned on), between functioning as an operation means for the connection apparatus and functioning as an operation means for the image reading apparatus. By this arrangement, it is possible to simplify the construction of the image reading apparatus, and it is possible for the user to perform operations for the various kinds of processing only at the setting place of the image reading apparatus without coming and going between the image reading apparatus and the personal computer. Accordingly, the user can efficiently perform the working operations for image reading, printing-out, etc., without taking wasteful labor.

Further, if such an arrangement as to display image information on a screen is employed, the user is enabled to give the various instructions from the operation means while confirming the image information.

Furthermore, if, for example, the above operation means is provided on the main body of a microfilm scanner arranged to project an image of each image frame portion of a microfilm on a screen and to read image information by scanning the projected image, while, in particular, in the case of scanning of microfilms, such a working operation as to read each target frame portion while replacing microfilms is frequently performed, it is not necessary for the user to come and go between the personal computer and the microfilm scanner at the time of replacement of microfilms, and it is possible for the user to perform all the various operations for the replacement of microfilms, the confirmation of an image on the microfilm, the reading and outputting of an image, etc., at the setting place of the microfilm scanner.

Third Embodiment

Figure 20:
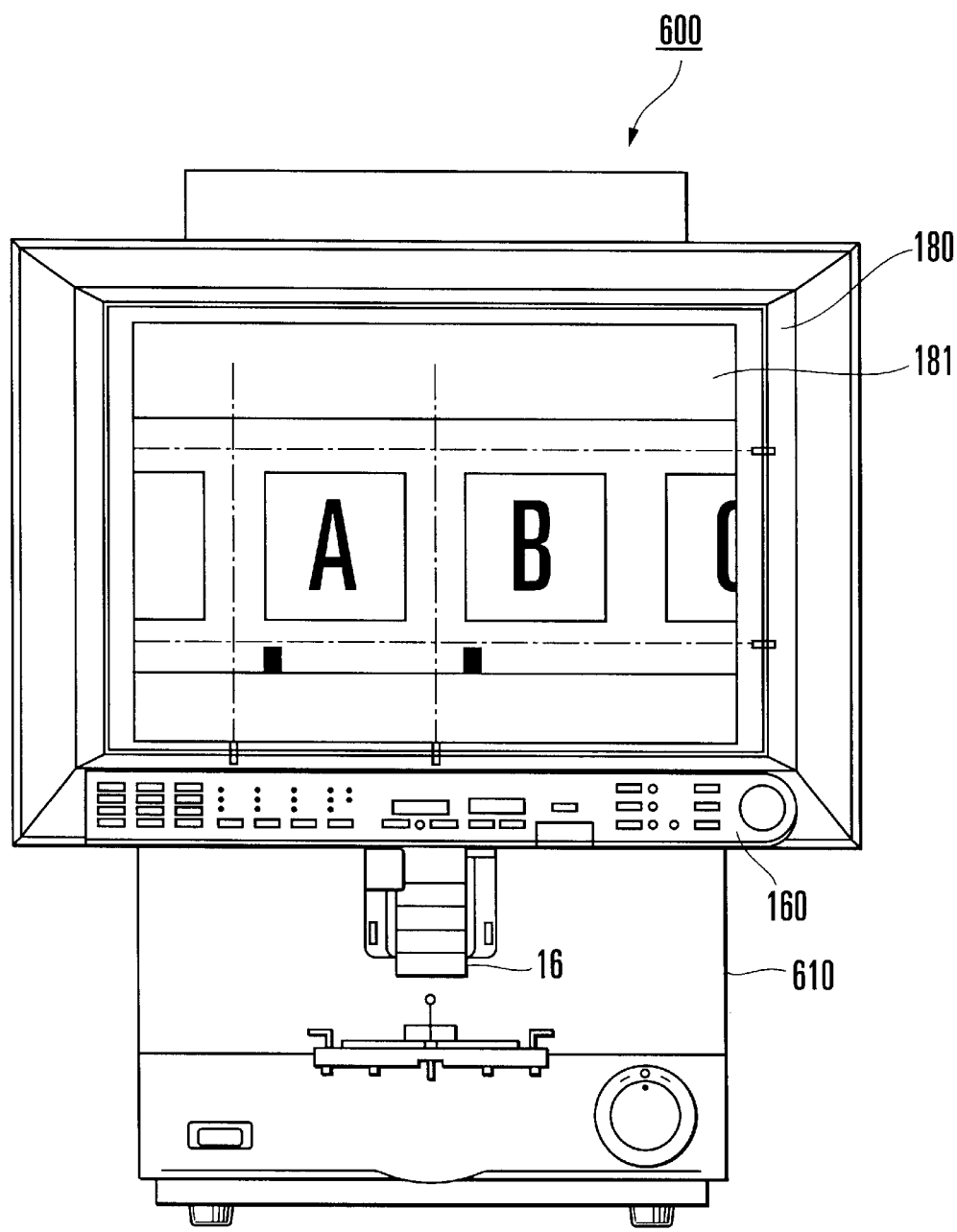
FIG. 20 is a front view of an image reading apparatus (microfilm scanner) according to a third embodiment of the invention.
Figure 21:
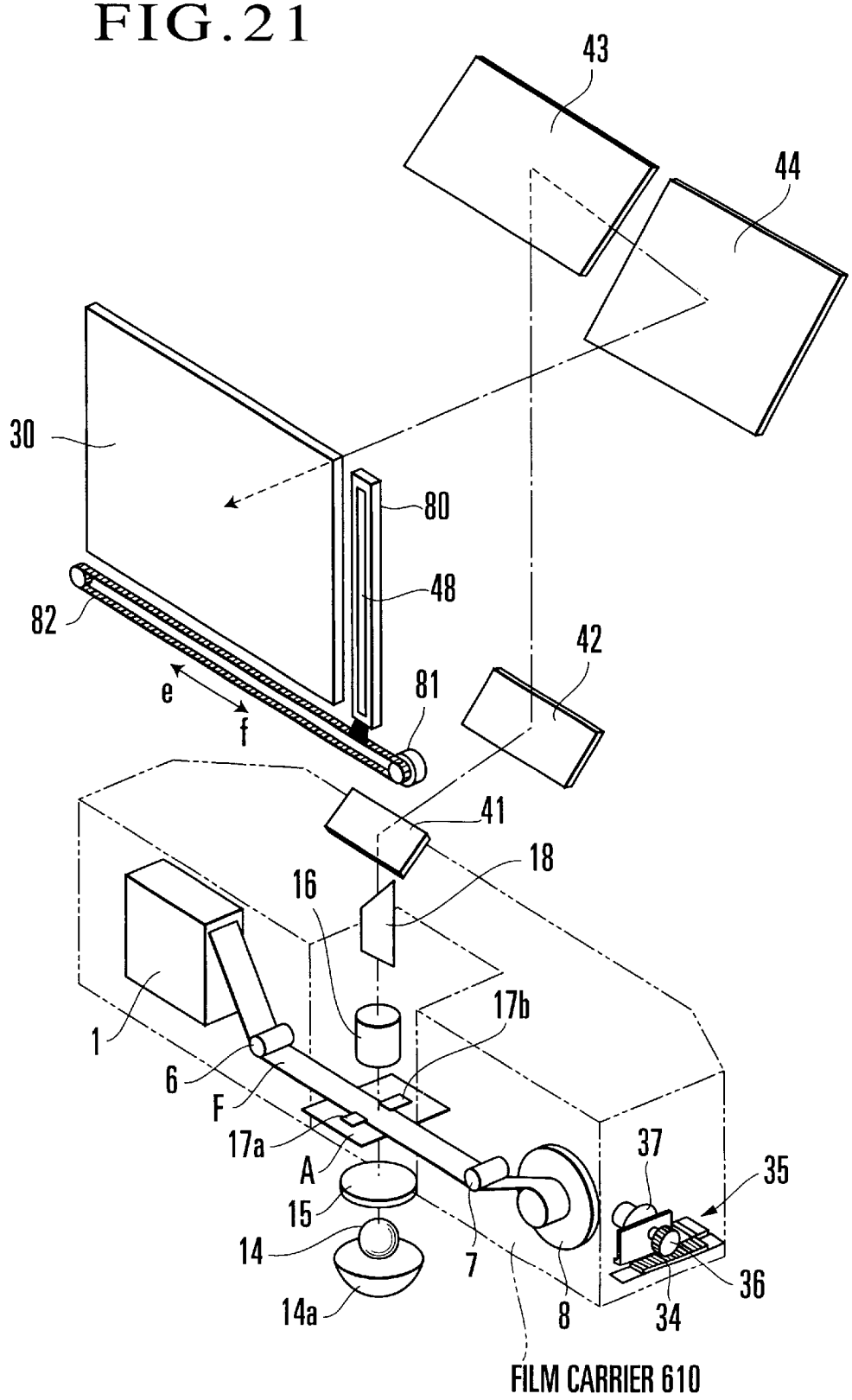
FIG. 21 is a perspective view showing the arrangement of an optical system within the microfilm scanner shown in FIG. 20.

FIG. 20 is a front view showing the outline arrangement of a microfilm scanner according to a third embodiment of the invention, and FIG. 21 is a perspective view showing the arrangement of an optical system disposed within the microfilm scanner shown in FIG. 20.

In FIG. 20, reference numeral 600 denotes the microfilm scanner, in which there are illustrated a roll film carrier 610 mounted on the microfilm scanner 600, a display part 180, a reader screen 181, and a projection lens 16.

According to the third embodiment, as will be described later, a desired image frame portion of a roll microfilm F is placed on a projection glass part A serving as a projection position, in accordance with an automatic image frame searching operation of the roll film carrier 610.

Then, referring to FIG. 21, each image frame portion placed on the projection glass part A is illuminated from the bottom side thereof by an illumination means, which is disposed within the main body of the roll film carrier 610 and includes a light source lamp 14, a spherical mirror 14a, a condenser lens 15, etc. Illumination light having passed through the image frame portion is projected and imaged on the back side of the reader screen (optical diffusing plate) 181 while being enlarged at a predetermined magnification, by a reader-part optical system including the projection lens 16, a prism lens 18 and first to fourth fixed mirrors 41 to 44. Accordingly, a microfilm image can be viewed, as an enlarged image, from the front side of the reader screen 181 (reader mode).

An image sensor 48 is disposed on a scanner unit 80. During the reader mode, the image sensor 48 is kept in such a position as to retreat from an optical path of the reader screen 181.

Then, if a microfilm image projected onto the reader screen 181 in an enlarged manner is to be scanned, an instruction for scanning is given from a host computer or an operation part of the main body of the microfilm scanner 600 (to be described later), so that the scanner unit 80 is moved in such a direction as to intrude into the optical path of the reader screen 181 (in directions indicated by arrows "e" and "f" in FIG. 21), by a belt 82 connected to a motor 81. Accordingly, image light is scanned by the image sensor 48 to effect image scanning (scanning mode).

Figure 22:
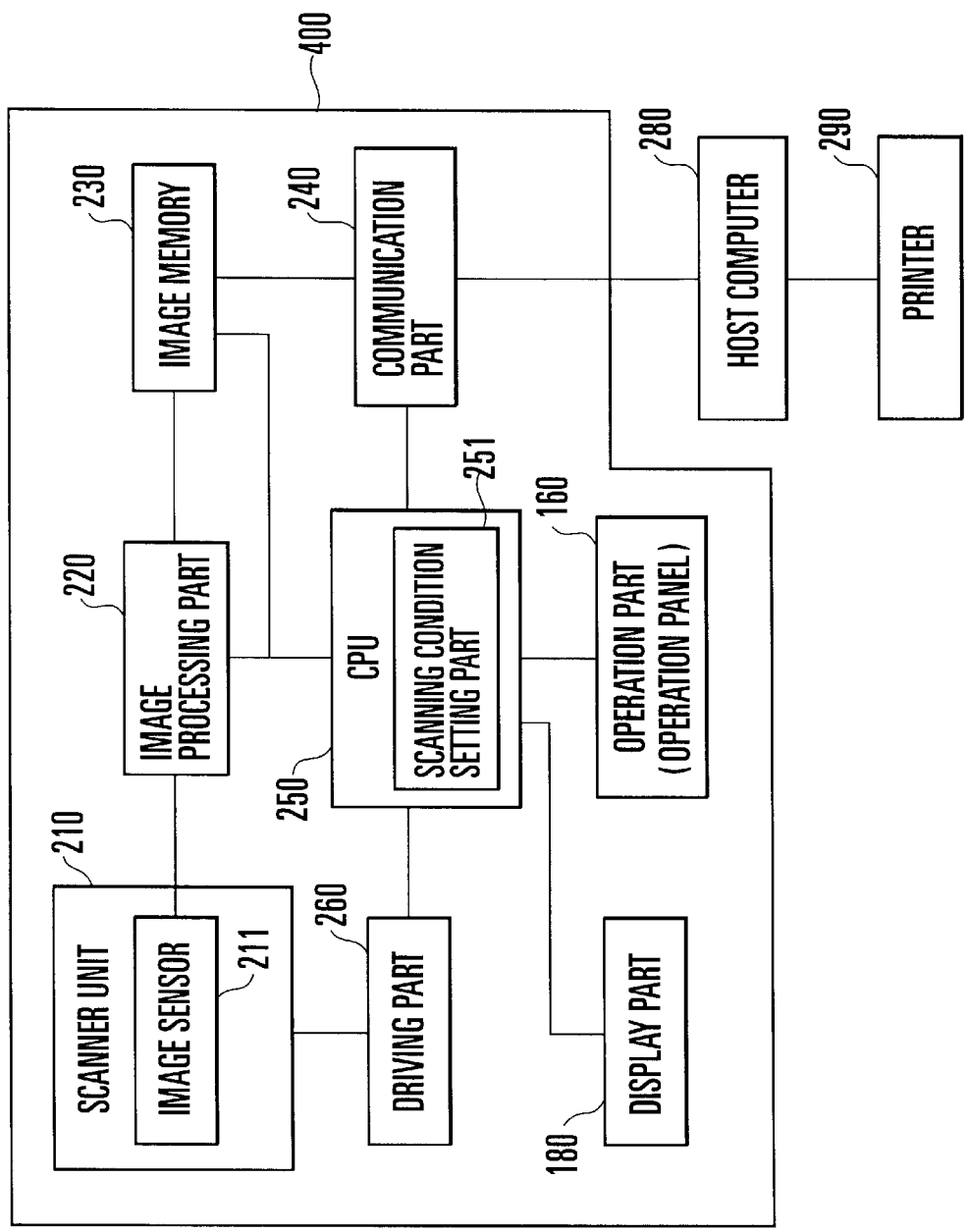
FIG. 22 is a block diagram showing the outline arrangement of the image reading apparatus shown in FIG. 20.

FIG. 22 is a block diagram showing the outline arrangement of the image reading apparatus (microfilm scanner) according to the third embodiment. In the case of the third embodiment, a host computer 280 and a printer 290, each of which serves as a connection apparatus, are connected to the image reading apparatus 400.

The image reading apparatus 400 is provided with a scanner unit 210 arranged to obtain image information of an original by scanning the microfilm F placed in the roll film carrier 610 by an image sensor 211.

Further, the image reading apparatus 400 is arranged to include a driving part 260 for the scanner unit 210, an image processing part 220 arranged to perform image processing, such as gradation conversion, image combining, etc., on the image information obtained by the scanner unit 210, an image memory 230 arranged to store therein image information obtained after the image processing by the image processing part 220, a communication part 240 arranged to communicate with the host computer (personal computer) 280 and the printer 290, which are connectable to the main body of the image reading apparatus 400, an operation part (operation panel) 160 arranged to perform the various kinds of setting for reading image information, and a CPU 250 arranged to preside over the action of the whole image reading apparatus 400. Then, a scanning condition setting part 251, which represents one of characteristic features of the third embodiment, is included in the CPU 250 as a program.

The image reading apparatus 400 having the above construction according to the third embodiment is fundamentally arranged to operate in accordance with an instruction from the host computer 280. However, the image reading apparatus 400 is also arranged to operate in accordance with an instruction from the operation part 160, depending on the content of the instruction.

The microfilm F, which is subjected to scanning by the image reading apparatus 400 according to the third embodiment so as to obtain image data, is a negative film or a positive film such as that shown in FIG. 16.

Further, the image reading apparatus 400 is arranged to allow one of the projection reference positions of "left reference", "center" and "continuous projection" to be arbitrarily selected.

In addition, as shown in FIG. 19, the operation part 160 is provided with a film designating part 169, a projection position designating part 167, a size designating part 161, etc. Then, the film designating part 169 is provided with a selection button 170, the projection position designating part 167 is provided with a selection button 168, and the size designating part 161 is provided with a selection button 162.

Then, if, as shown in FIG. 19, the kind of "positive" is selected as the film, the position of "center" is selected as the projection reference position and the fixed-form size of "A3" is selected as the scanning area size, each image frame portion of the film is projected on the reader screen 181 in the A3 size with the center reference position, as shown in FIG. 19.

Further, if, as shown in FIG. 17, the kind of "negative" is selected as the film, the position of "left reference" is selected as the projection reference position and the fixed-form size of "A4" is selected as the scanning area size, each image frame portion of the film is projected on the reader screen 181 in the A4 size with the left reference position, as shown in FIG. 17.

Next, an image reading method which is one of principal characteristic features of the image reading apparatus 400 according to the third embodiment will be described with reference to the flow charts of FIGS. 23 and 24.

Figure 23:
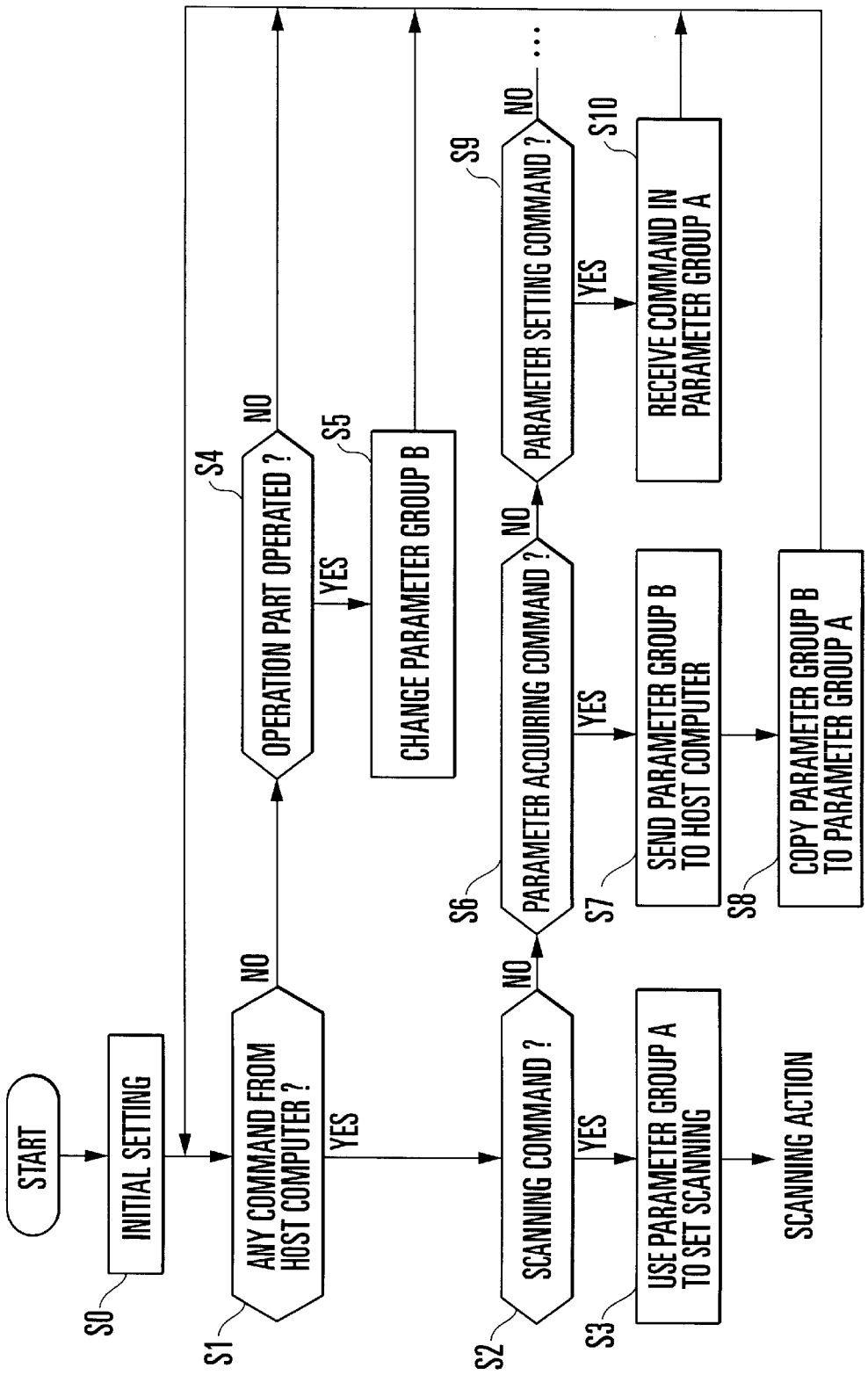
FIG. 23 is a flow chart showing a first example of the scanning action according to the third embodiment of the invention.
Figure 24:
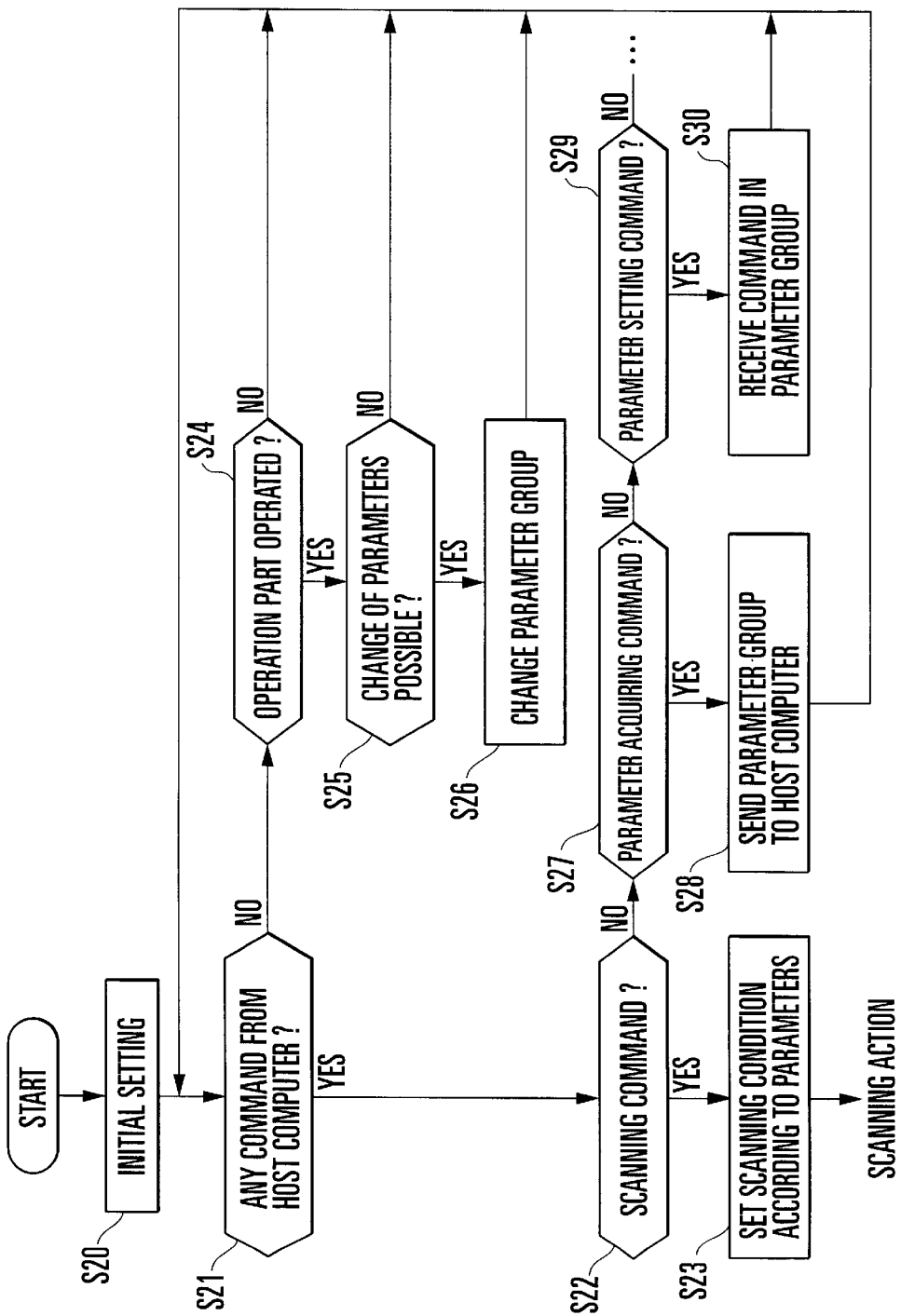
FIG. 24 is a flow chart showing a second example of the scanning action according to the third embodiment of the invention.

The flow chart of FIG. 23 shows the procedure in which, after the host computer 280 connected to the image reading apparatus 400 has started an image scanning action, the image is scanned in accordance with a scanning condition set by the host computer 280, irrespective of a scanning condition inputted from the operation part 160.

In the procedure shown in FIG. 23, when the processing operation starts, an initializing operation is first performed in step SO. Then, the flow proceeds to step S1, where a check is made to find if any command from the host computer 280 has been received.

If it is found as a result of check in the step S1 that a command from the host computer 280 has been received, the flow proceeds to step S2, where a check is made to find if the command as received is a scanning command. If it is found as a result of check in the step S2 that the command as received is the scanning command, the flow proceeds to step S3, where a first parameter group A is used to set a scanning condition, and, then, a scanning action is started. Here, the first parameter group A is composed of scanning parameters inputted from the host computer 280.

On the other hand, if it is found as a result of check in the step S1 that no command from the host computer 280 has been received, the flow proceeds to step S4, where a check is made to find if the operation part 160 has been operated.

If it is found as a result of check in the step S4 that the operation part 160 has not been operated, the flow returns to step S1. If the operation part 160 has been operated, the flow proceeds to step S5, where a second parameter group B is changed.

Further, if it is found as a result of check in the step S2 that a command from the host computer 280 is not the scanning command, the flow proceeds to step S6, where a check is made to find if the command from the host computer 280 is a parameter acquiring command. If it is found as a result of check in the step S6 that the command from the host computer 280 is the parameter acquiring command, the flow proceeds to step S7, where the second parameter group B is sent to the host computer 280. Then, the flow proceeds to step S8. In the step S8, at the host computer 280, the second parameter group B as received is copied to the first parameter group A.

If it is found as a result of check in the step S6 that the command from the host computer 280 is not the parameter acquiring command, the flow proceeds to step S9. In the step S9, a check is made to find if the command from the host computer 280 is a parameter setting command. If the command from the host computer 280 is the parameter setting command, the flow proceeds to step S10, where the command from the host computer 280 is received in the first parameter group A.

Since the image reading apparatus 400 according to the third embodiment performs image scanning in the above-described manner, even if a scanning condition is changed by operating the operation part 160 after the host computer 280 has started a scanning action, it is possible to effectively prevent a scanning action which is not recognized by the host computer 280 from being performed.

Accordingly, there is no possibility that such a trouble that the host computer 280 mistakes the scanning size occurs. Therefore, it is possible to prevent image data from coming into a scrambled state due to the mistake of the scanning size.

Next, a second example of the image reading method according to the third example will be described with reference to the flow chart of FIG. 24.

In the image scanning method shown in the flow chart of FIG. 23, after the host computer 280 has started a scanning action, the operation of the operation part 160 is ignored. On the contrary, in the second example of the image reading method, even after the host computer 280 has started a scanning action, a scanning condition is allowed to be changed according to the input from the operation part 160, under a certain condition.

In the case of the second example of the image reading method according to the third embodiment, when the processing operation starts, an initializing operation is first performed in step S20. Then, the flow proceeds to step S21, where a check is made to find if any command from the host computer 280 has been received.

If it is found as a result of check in the step S21 that a command from the host computer 280 has been received, the flow proceeds to step S22, where a check is made to find if the command as received is a scanning command. If it is found as a result of check in the step S22 that the command as received is the scanning command, the flow proceeds to step S23, where a scanning condition according to scanning parameters is set, and, then, a scanning action is started.

On the other hand, if it is found as a result of check in the step S21 that no command from the host computer 280 has been received, the flow proceeds to step S24, where a check is made to find if the operation part 160 has been operated.

If it is found as a result of check in the step S24 that the operation part 160 has not been operated, the flow returns to step S21. If the operation part 160 has been operated, the flow proceeds to step S25, where a check is made to find if it is possible for scanning parameters to be changed on the basis of a command inputted from the operation part 160. Here, it is in the case of a change of the scanning size that a change of the scanning parameters is impossible. In the case of changes other than a change of the scanning size, such changes are determined to be possible even if an image scanning mode is more or less changed.

If it is found as a result of check in the step S25 that a change of the scanning parameters is possible, the flow proceeds to step S26, where a parameter group is changed. Then, the flow returns to step S21.

Further, if it is found as a result of check in the step S22 that a command from the host computer 280 is not the scanning command, the flow proceeds to step S27, where a check is made to find if the command from the host computer 280 is a parameter acquiring command. If it is found as a result of check in the step S27 that the command from the host computer 280 is the parameter acquiring command, the flow proceeds to step S28, where the parameter group is sent to the host computer 280. Then, the flow returns to step S21.

If it is found as a result of check in the step S27 that the command from the host computer 280 is not the parameter acquiring command, the flow proceeds to step S29. In the step S29, a check is made to find if the command from the host computer 280 is a parameter setting command. If the command from the host computer 280 is the parameter setting command, the flow proceeds to step S30, where the command from the host computer 280 is received in the parameter group.

Since the image reading apparatus using the second example of the image reading method according to the third embodiment performs image scanning in the above-described manner, even after the host computer 280 has started a scanning action, it is possible to change a scanning condition by operating the operation part 160. By this arrangement, it becomes possible to perform the setting for scanning in the vicinity of the reader screen 181, and, therefore, it is possible to omit the labor of going to the place of the host computer 280 for a slight change of the scanning condition, thereby improving the working efficiency.

As has been described above, in an image reading apparatus according to the third embodiment, after a host computer has started a scanning action for an image, the image is scanned in accordance with a scanning condition set by the host computer, irrespective of a scanning condition inputted from an operation part provided on the main body of the image reading apparatus. Accordingly, even if a scanning condition is changed by operating the operation part after the host computer has started a scanning action, it is possible to effectively prevent a scanning action which is not recognized by the host computer from being performed. Therefore, it is possible to surely prevent the occurrence of such a trouble that the host computer mistakes the scanning size, and it is possible to prevent image data from coming into a scrambled state due to the mistake of the scanning size.

Further, in a case where a command for changing a scanning condition is issued from the operation part provided on the main body of the image reading apparatus after the host computer has started an image scanning action, if it is possible to perform image scanning on the basis of the command, the image is scanned in accordance with a scanning condition set by the input from the operation part. Accordingly, even after the host computer has started a scanning action, it is possible to change a scanning condition by operating the operation part. By this arrangement, it becomes possible to perform the setting for scanning in the vicinity of the image reading apparatus, and, therefore, it is possible to omit the labor of going to the place of the host computer for a slight change of the scanning condition, thereby improving the working efficiency.

Fourth Embodiment

Figure 25:
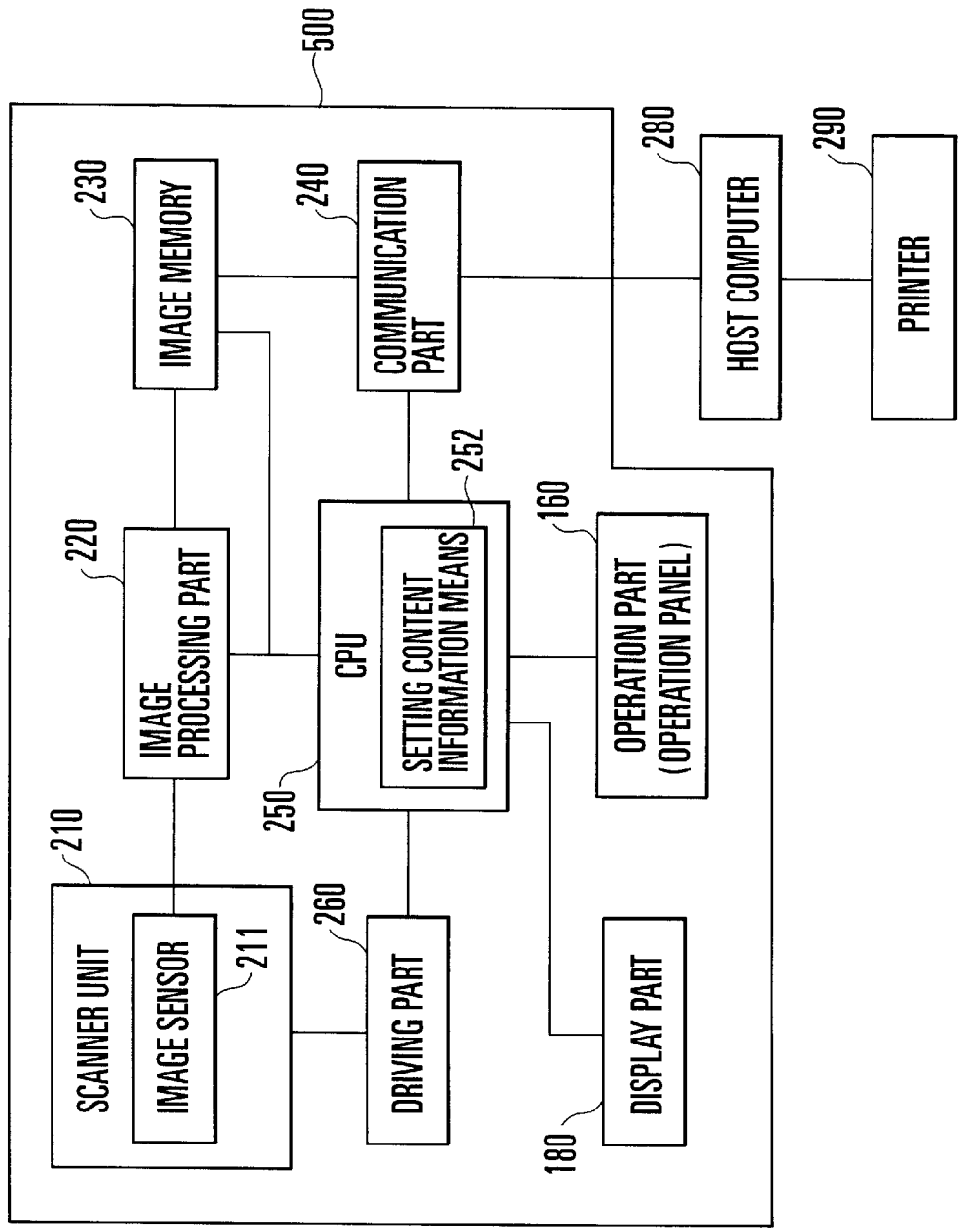
FIG. 25 is a block diagram showing the outline arrangement of an image reading apparatus according to a fourth embodiment of the invention.

FIG. 25 is a block diagram showing the outline arrangement of an image reading apparatus according to a fourth embodiment of the invention. In the case of the fourth embodiment, a host computer 280 and a printer 290, each of which serves as a connection apparatus, are connected to the image reading apparatus 500.

The image reading apparatus 500 is provided with a scanner unit 210 arranged to obtain image information of an original by scanning a microfilm F placed in the above-mentioned roll film carrier 610 by an image sensor 211.

Further, the image reading apparatus 500 is arranged to include a driving part 260 for the scanner unit 210, an image processing part 220 arranged to perform image processing, such as gradation conversion, image combining, etc., on the image information obtained by the scanner unit 210, an image memory 230 arranged to store therein image information obtained after the image processing by the image processing part 220, a communication part 240 arranged to communicate with the host computer (personal computer) 280 and the printer 290, which are connectable to the main body of the image reading apparatus 500, an operation part (operation panel) 160 arranged to perform the various kinds of setting for reading image information, and a CPU 250 arranged to preside over the action of the whole image reading apparatus 500. Then, a setting content information means 252, which represents one of characteristic features of the fourth embodiment, is included in the CPU 250 as a program.

The image reading apparatus 500 having the above construction according to the fourth embodiment is fundamentally arranged to operate in accordance with an instruction from the host computer 280. However, the image reading apparatus 500 is also arranged to operate in accordance with an instruction from the operation part 160, depending on the content of the instruction.

The microfilm F, which is subjected to scanning by the image reading apparatus 500 according to the fourth embodiment so as to obtain image data, is a negative film or a positive film such as that shown in FIG. 16.

Further, the image reading apparatus 500 is arranged to allow one of the projection reference positions of "left reference", "center" and "continuous projection" to be arbitrarily selected.

In addition, as shown in FIG. 19, the operation part 160 is provided with a film designating part 169, a projection position designating part 167, a size designating part 161, etc. Then, the film designating part 169 is provided with a selection button 170, the projection position designating part 167 is provided with a selection button 168, and the size designating part 161 is provided with a selection button 162.

Then, if, as shown in FIG. 19, the kind of "positive" is selected as the film, the position of "center" is selected as the projection reference position and the fixed-form size of "A3" is selected as the scanning area size, each image frame portion of the film is projected on the reader screen 181 in the A3 size with the center reference position, as shown in FIG. 19.

Further, if, as shown in FIG. 17, the kind of "negative" is selected as the film, the position of "left reference" is selected as the projection reference position and the fixed-form size of "A4" is selected as the scanning area size, each image frame portion of the film is projected on the reader screen 181 in the A4 size with the left reference position, as shown in FIG. 17.

Next, an image reading method which is one of principal characteristic features of the image reading apparatus 500 according to the fourth embodiment will be described with reference to the flow chart of FIGS. 26.

Figure 26:
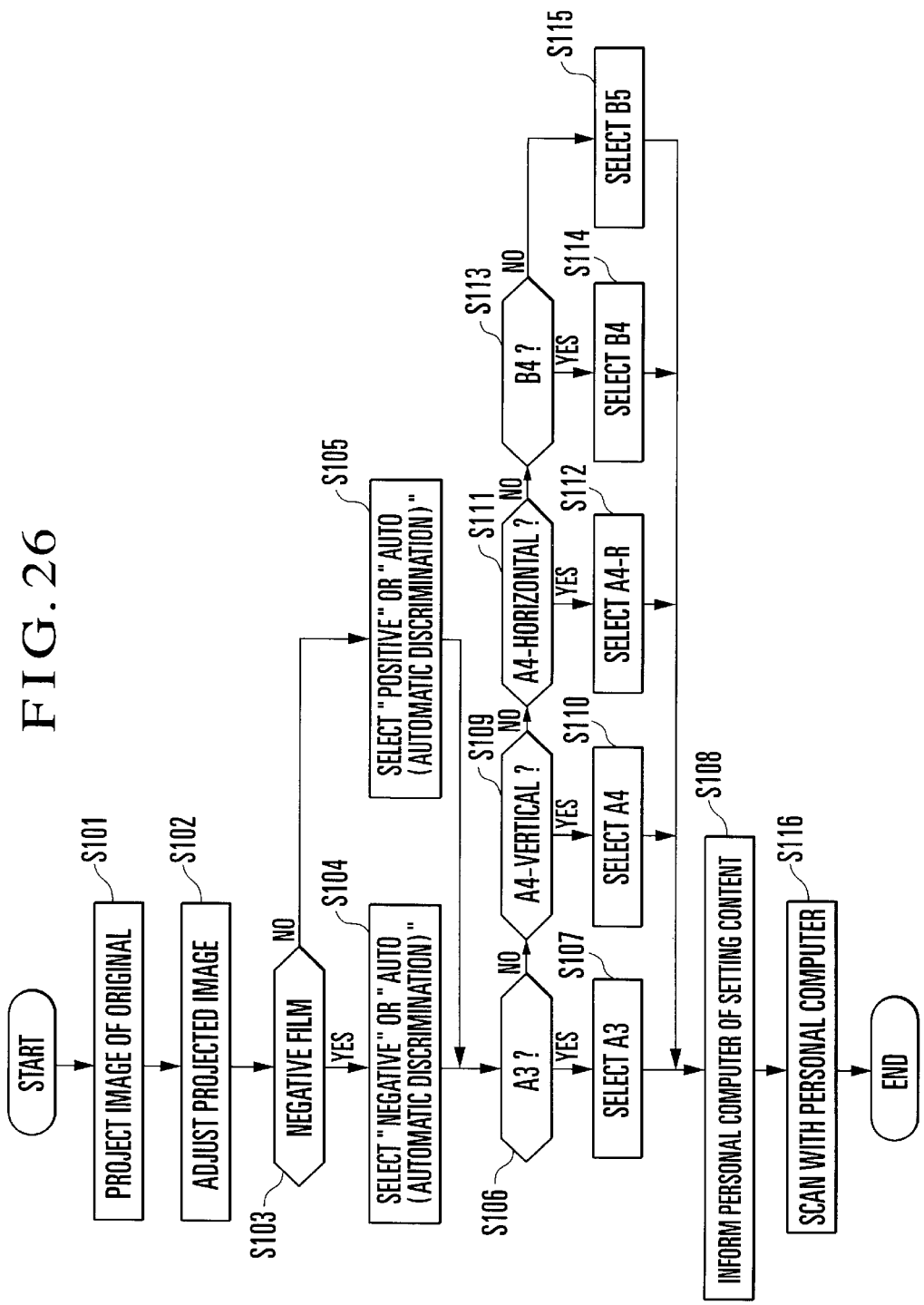
FIG. 26 is a flow chart showing an example of the scanning action according to the fourth embodiment of the invention.

Referring to FIG. 26, when the processing operation starts, in the first step S101, an image on an original is projected onto the reader screen 181.

In the next step S102, an adjustment of the projected image is performed. That adjustment is made by operating the operation part 160 disposed on the image reading apparatus 500.

Then, the flow proceeds to step S103, where a check is made to find if a recording medium (original) set in the image reading apparatus 500 is a negative film.

If it is found as a result of check in the step S103 that the recording medium is a negative film, the flow proceeds to step S104, where the kind of "negative" or "auto (automatic discrimination)" is selected by the operation of the selection button 170 of the film designating part 169.

In the next step S106, a check is made to find if the scanning size is "A3". If it is found as a result of check in the step S106 that the scanning size is "A3", the flow proceeds to step S107, where the size of "A3" is selected by operating the selection button 162 of the size designating part 161.

Further, if it is found as a result of check in the step S106 that the scanning size is not "A3", the flow proceeds to step S109, where a check is made to find if the scanning size is "A4-vertical". If it is found as a result of check in the step S109 that the scanning size is "A4-vertical", the flow proceeds to step S110, where the size of "A4-vertical" is selected by operating the selection button 162 of the size designating part 161.

Further, it is found as a result of check in the step S109 that the scanning size is not "A4-vertical", the flow proceeds to step S111, where a check is made to find if the scanning size is "A4-horizontal (A4-R)". If it is found as a result of check in the step S111 that the scanning size is "A4-horizontal", the flow proceeds to step S112, where the size of "A4-horizontal (A4-R)" is selected by operating the selection button 162 of the size designating part 161.

Further, if it is found as a result of check in the step S111 that the scanning size is not "A4-horizontal", the flow proceeds to step S113, where a check is made to find if the scanning size is "B4". If it is found as a result of check in the step S113 that the scanning size is "B4", the flow proceeds to step S114, where the size of "B4" is selected by operating the selection button 162 of the size designating part 161.

Further, if it is found as a result of check in the step S113 that the scanning size is not "B4", the flow proceeds to step S115, where the size of "B5" is selected by operating the selection button 162 of the size designating part 161.

After the predetermined size has been set in the above-described manner, the flow proceeds to step S108, where the setting content information means 252 is made to inform the host computer (personal computer) 280 of the content of the above setting.

Then, the flow proceeds to step S116, where a scanning action of the image reading apparatus 500 is controlled by the host computer 280 to scan an image displayed on the reader screen 181 so as to obtain image data.

Since the image reading apparatus 500 according to the fourth embodiment performs image scanning in the above-described manner, it is possible for the user to perform the various kinds of setting for image scanning by operating the operation part 160 while viewing the reader screen 181.

By this arrangement, in the image reading apparatus according to the fourth embodiment, it is possible for the user to easily perform the various kinds of setting, which the user would have to perform after going to the place of the host computer in the past, while viewing the reader screen 181. Therefore, it is possible to improve greatly the efficiency of the setting working.

Further, since it is possible to perform the setting working while viewing an image projected on the reader screen 181, it is possible to perform the fine setting without preparing a preview picture. Incidentally, while, in the fourth embodiment, the microfilm F is used as a recording medium by way of example, the recording medium in the present invention is not limited to the microfilm F but may be another recording medium such as paper, as long as the recording medium is usable for projecting an image.

As has been described above, according to the fourth embodiment, an image reading apparatus having an image display screen and arranged to display an image formed on a recording medium on the image display screen and to form image data by scanning the image is provided with an operation part for setting a condition relating to scanning of the image, and a setting content information means for transmitting a content of the condition set by the operation part to a host computer which is externally connected to the image reading apparatus. Accordingly, it is possible for the host computer to always grasp the content set by the operation part. By this arrangement, it is possible for the user to perform the various kinds of setting by operating the operation part, even in the state where the host computer is connected to the image reading apparatus.

Therefore, it is possible to omit such a trouble as to go to the place of the host computer for the purpose of setting a scanning condition, and it is possible to greatly improve the efficiency of the various working operations which the user performs while viewing the reader screen.

Other Embodiments

The present invention may be applied to a system composed of a plurality of apparatuses (for example, a host computer, an interface apparatus, a reader, a printer, etc.), or may be applied to a single apparatus.

Further, the present invention should not be construed to be limited to the apparatus and the method for attaining the above-described embodiments. Such an arrangement as to attain the above-described embodiments by supplying the system or a computer (CPU or MPU) disposed within the apparatus with program codes of software for realizing the above-described embodiments and causing the system or the computer to operate various devices in accordance with the program codes of software is also included in the scope of the invention.

Further, in that instance, the program codes themselves serve to realize the functions of each of the above-described embodiments. Thus, the program codes themselves, and a means for supplying the program codes to the computer, i.e., a storage medium which stores therein the program codes, are included in the scope of the invention. The storage medium which stores therein the program codes can be selected from among various media, such as a floppy disk, a hard disk, an optical disk, a magneto-optical disk, a CD-ROM, a magnetic tape, a nonvolatile memory card, a ROM, etc.

Further, not only in a case where the above-described embodiments are realized by the computer controlling the various devices in accordance with the program codes as supplied, but also in a case where the above-described embodiments are realized by the program codes cooperating with an OS (operating system) operating on the computer or with another application software, such program codes are included in the scope of the invention.

Further, in a case where, after the program codes as supplied are stored in a memory provided in a function extending board of the computer or a function extending unit connected to the computer, a CPU or the like provided on the function extending board or the function extending unit performs a part or the whole of the actual processes according to instructions of the program codes, such program codes are also included in the scope of the invention.

What is claimed is:

1. An image reading apparatus for performing a reading action of reading image information from a predetermined medium, said image reading apparatus comprising:

a connection unit capable of connecting a connection apparatus having a predetermined function to said image reading apparatus;

an operation unit adapted to give instruction for an action of the connection apparatus connected by said connection unit and an instruction for the reading action; and a switching unit adapted to, on the basis of a connection state of said connection unit or a state of the connection apparatus connected by said connection unit, switch a function of said operation unit between functioning for giving the instruction for an action of the connection apparatus and functioning for giving the instruction for the reading action.

2. An image reading apparatus according to claim 1, wherein the connection apparatus includes a printer for printing out the image information, the instruction for an action of the connection apparatus includes an instruction for paper size in printing-out, and the instruction for the reading action includes an instruction for size of an image reading area.

3. An image reading apparatus according to claim 1, further comprising a display unit adapted to display, on a screen thereof, the image information.

4. An image reading apparatus according to claim 1, wherein the predetermined medium includes a microfilm.

5. An image reading apparatus according to claim 1, wherein the predetermined medium includes a microfilm, and said image reading apparatus further comprises a display unit on which an image of the microfilm is to be projected, and a reading unit adapted to scan the image projected on said display unit to read the image information.

6. An image processing system composed of a plurality of connection apparatuses which are communicatably connected to one another, at least one of the plurality of connection apparatuses being an image reading apparatus for performing a reading action of reading image information from a predetermined medium, and comprising a connection unit adapted to connect a connection apparatus having a predetermined function to said image reading apparatus, an operation unit adapted to give an instruction for an action of the connection apparatus connected by said connection unit and an instruction for the reading action, and a switching unit adapted to, on the basis of a connection state of said connection unit or a state of the connection apparatus connected by said connection unit, switch a function of said operation means between functioning for giving the instruction for an action of the connection apparatus and functioning for giving the instruction for the reading action.

7. An operation control method for performing a reading action of reading image information from a predetermined medium and outputting the image information, comprising:

a switching step of, on the basis of a state indicative of whether a connection apparatus having a predetermined function is connected or a state of the connection apparatus having the predetermined function as connected, switching over a function of an operation part between a function for giving an instruction for an action of the connection apparatus and a function for giving an instruction for the reading action; and a control step of performing an operation control based on an operation state of the operation part the function of which has been switched over by said switching step.

8. An operation control method according to claim 7, wherein the connection apparatus includes a printer for printing out the image information, the instruction for an action of the connection apparatus includes an instruction for paper size in printing-out, and the instruction for the reading action includes an instruction for size of an image reading area.

9. An operation control method according to claim 7, further comprising a display step of causing a display part to display, on a screen thereof, the image information.

10. An operation control method according to claim 7, wherein the predetermined medium includes a microfilm.

11. An operation control method according to claim 7, wherein the predetermined medium includes a microfilm, and said operation control method further comprises a projection step of projecting an image of the microfilm onto a screen, and a reading step of reading image information of the image projected on the screen.

12. An image reading apparatus, comprising:

a scanning unit capable of obtaining image data by scanning an image formed on a recording medium; and scanning-condition setting unit capable of setting a condition for scanning the image by said scanning unit on the basis of a an instruction from a host computer connected to said image reading apparatus or an instruction inputted from an operation part disposed on said image reading apparatus, wherein, after the host computer has started an image scanning operation, said scanning-condition setting unit sets the condition in accordance with the instruction from the host computer, irrespective of the instruction inputted from the operation part.

13. An image reading apparatus according to claim 12, comprising:

scanning means for obtaining image data by sequentially transporting a plurality of images formed on a recording medium to a predetermined position and scanning each image transported to the predetermined position; and scanning-condition setting means for setting a condition for scanning the image on the basis of a scanning condition inputted from a host computer connected to said image reading apparatus or a scanning condition inputted from a main body operation part disposed on said image reading apparatus, wherein, after the host computer has started an image scanning action, said scanning-condition setting means causes said scanning means to scan the image in accordance with the scanning condition set by the host computer, irrespective of the scanning condition inputted from the main body operation part.

14. An image reading apparatus according to claim 12, wherein said scanning-condition setting unit is provided with a first instruction group composed of instructions inputted from the host computer and a second instruction group composed of instructions inputted from the operation part, and, after the host computer has started an image scanning operation, said scanning-condition setting unit sets the condition in accordance with an instruction in the first instruction group.

15. An image reading apparatus according to claim 12, further comprising a display unit adapted to display, on a screen thereof, image information, wherein an image projected on said display unit is scanned by said scanning unit to obtain image data.

16. An image reading apparatus according to claim 12, wherein the recording medium is a microfilm.

17. An image reading apparatus, comprising:
a scanning unit adapted to obtain image data by scanning an image formed on a recording medium; and
a scanning-condition setting unit capable of setting a condition for scanning the image by said scanning unit on the basis of an instruction from a host computer connected to said image reading apparatus or an instruction inputted from an operation part disposed on said image reading apparatus,
wherein, if it is possible to change the condition even after the host computer has started an image scanning operation, said scanning-condition setting unit changes the condition in accordance with the instruction inputted from the operation part.

18. An image reading apparatus according to claim 17, comprising:
scanning means for obtaining image data by sequentially transporting a plurality of images formed on a recording medium to a predetermined position and scanning each image transported to the predetermined position; and
scanning-condition setting means for setting a condition for scanning the image on the basis of a scanning condition inputted from a host computer connected to said image reading apparatus or a scanning condition inputted from a main body operation part disposed on said image reading apparatus,
wherein, if it is possible to scan the image even after the host computer has started an image scanning action, said scanning-condition setting means causes said scanning means to scan the image in accordance with the scanning condition set by the main body operation part.

19. An image reading apparatus according to claim 17, further comprising a display unit adapted to display, on a screen thereof, image information, wherein an image projected on said display unit is scanned by said scanning unit to obtain image data.

20. An image reading apparatus according to claim 17, wherein the recording medium is a microfilm.

21. An image reading method for obtaining image data by causing an image reading apparatus to scan an image formed on a recording medium, said image reading method comprising the steps of:
causing a scanning-condition setting unit to set a condition for scanning the image by said scanning unit on the basis of an instruction from a host computer connected to said image reading apparatus or an instruction inputted from an operation part disposed on said image reading apparatus; and
after the host computer has started an image scanning action, causing said image reading apparatus to scan the image in accordance with the instruction from the host computer, irrespective of the instruction inputted from the operation part.

22. An image reading method according to claim 21 for obtaining image data by causing an image reading apparatus to sequentially transport a plurality of images formed on a recording medium to a predetermined position and to scan each image transported to the predetermined position, said image reading method comprising the steps of:
causing scanning-condition setting means to set a condition for scanning the image on the basis of a scanning condition inputted from a host computer connected to said image reading apparatus or a scanning condition inputted from a main body operation part disposed on said image reading apparatus; and
after the host computer has started an image scanning action, causing said image reading apparatus to scan the image in accordance with the scanning condition set by the host computer, irrespective of the scanning condition inputted from the main body operation part.

23. An image reading method according to claim 21, wherein said scanning-condition setting unit is provided with a first instruction group composed of instructions inputted from the host computer and a second instruction group composed of instructions inputted from the operation part, and, after the host computer has started an image scanning operation, said scanning-condition setting unit sets the condition by using the first instruction group.

24. An image reading method according to claim 21, wherein said image reading apparatus further comprises a display unit adapted to display, on a screen thereof, image information, and an image projected on said display unit is scanned by a scanning unit to obtain image data.

25. An image reading method according to claim 21, wherein the recording medium is a microfilm.

26. An image reading method for obtaining image data by causing an image reading apparatus to scan an image formed on a recording medium, said image reading method comprising the steps of:
causing a scanning-condition setting unit to set a condition for scanning the image by the scanning unit on the basis of an instruction inputted from a host computer connected to said image reading apparatus or an instruction inputted from a an operation part disposed on said image reading apparatus; and
if it is possible to change the condition even after the host computer has started an image scanning operation causing said image reading apparatus to change the condition in accordance with the instruction inputted by the operation part.

27. An image reading method according to claim 26 for obtaining image data by causing an image reading apparatus to sequentially transport a plurality of images formed on a recording medium to a predetermined position and to scan each image transported to the predetermined position, said image reading method comprising the steps of:
causing scanning-condition setting means to set a condition for scanning the image on the basis of a scanning condition inputted from a host computer connected to said image reading apparatus or a scanning condition inputted from a main body operation part disposed on said image reading apparatus; and
if it is possible to scan the image even after the host computer has started an image scanning action, causing said image reading apparatus to scan the image in accordance with the scanning condition set by the main body operation part.

28. An image reading method according to claim 26, wherein said image reading apparatus further comprises a display unit adapted to display, on a screen thereof, image information, and an image projected on said display unit is scanned by a scanning unit to obtain image data.

29. An image reading method according to claim 26, wherein the recording medium is a microfilm.

30. An image reading apparatus having an image display screen and arranged to display, on the image display screen, an image formed on a recording medium and to scan the image so as to form image data, said image reading apparatus comprising:

an operation part for setting a condition relating to scanning of the image; and a setting-content information unit capable of transmitting a content set by said operation part to a host computer which is externally connected to said image reading apparatus.

31. An image reading apparatus according to claim 30, wherein said operation part is a unit capable of setting a scanning size while viewing a picture displayed on the image display screen.

32. An image reading apparatus according to claim 30, wherein said operation part is a unit capable of setting a kind of the recording medium.

33. An image reading apparatus according to claim 30, wherein the recording medium is a microfilm.

34. An image reading system composed of:

an image reading apparatus comprising an image data forming unit capable of displaying, on an image display screen, an image formed on a recording medium and capable of scanning the image to form image data, an operation part for setting a condition relating to scanning of the image, and a setting-content information unit capable of for transmitting a content set by said operation part to a host computer which is externally connected to said image reading apparatus; and said host computer for controlling a scanning action of said image reading apparatus on the basis of information transmitted from said setting-content information unit.

35. An image reading method using an image reading apparatus having an image display screen and arranged to display, on the image display screen, an image formed on a recording medium and to scan the image so as to form image data, said image reading method comprising the steps of:

transmitting a content set by an operation part for setting a condition relating to scanning of the image, to a host computer which is externally connected to said image reading apparatus; and causing said host computer to control a scanning action on the basis of information of the transmitted content.

36. An image reading method according to claim 35, wherein a scanning size for reading an image is set by operating said operation part while viewing a picture displayed on the image display screen.

37. An image reading method according to claim 35, wherein a kind of the recording medium is set for reading an image by operating said operation part.

38. An image reading method according to claim 35, wherein the recording medium is a microfilm.

* * * * *

UNITED STATES PATENT AND TRADEMARK OFFICE
CERTIFICATE OF CORRECTION

PATENT NO. : 6,674,553 B1 Page 1 of 1
DATED : January 6, 2004
INVENTOR(S) : Yohei Ito It is certified that error appears in the above-identified patent and that said Letters Patent is hereby corrected as shown below:

Column 24,
Line 33, delete "a an operation" and insert -- an operation --.

Signed and Sealed this

Second Day of May, 2006

JON W. DUDAS
*Director of the United States Patent and Trademark Office*